(12) United States Patent
Mano et al.

(10) Patent No.: US 6,346,800 B1
(45) Date of Patent: *Feb. 12, 2002

(54) POWER SUPPLY DEVICE AND FIXING DEVICE OPERATING WITH THE POWER SUPPLY DEVICE

(75) Inventors: Hiroshi Mano; Minoru Hayasaki, both of Tokyo (JP)

(73) Assignee: Canon Kabushiki Kaisha (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 25 days.

(21) Appl. No.: 09/511,779

(22) Filed: Feb. 23, 2000

(30) Foreign Application Priority Data

Feb. 24, 1999 (JP) ............................................. 11-046063
May 13, 1999 (JP) ............................................. 11-132758

(51) Int. Cl.$^7$ ................................................. G05F 1/46
(52) U.S. Cl. ........................ 323/282; 323/355; 323/225; 399/37
(58) Field of Search .............................. 323/222, 224, 323/225, 235, 247, 282, 355; 399/37

(56) References Cited

U.S. PATENT DOCUMENTS 5,329,225 A * 7/1994 Roshen et al. ............ 323/351 X
5,841,268 A * 11/1998 Medmik .................... 323/222
6,236,191 B1 * 5/2001 Chaffai ..................... 323/225

FOREIGN PATENT DOCUMENTS

| JP | 51-109739 | 1/1975 |
|----|-----------|--------|
| JP | 63-313182 | 12/1988 |
| JP | 2-157878 | 6/1990 |
| JP | 4-44075 | 2/1992 |
| JP | 4-204980 | 7/1992 |

* cited by examiner

Primary Examiner—Jessica Han
(74) Attorney, Agent, or Firm—Rossi & Associates

(57) ABSTRACT

A power supply device and a voltage resonance method are provided, which are free from a reduced switching loss, as well as from the situation in which soft switching operations for generating an alternating magnetic field cannot be executed. A first charging device is connected in series with a first switching device, a second switching device is connected in series with the first charging device, and a magnetic field generating device is connected between a power supply line and a node between the first charging device and the second switching device. A second charging device is connected in parallel with the second switching device, a first rectifying device is connected in parallel with the first switching device, and a second rectifying device connected in parallel with the second switching device. A switching control circuit controls driving of the first and second switching devices, such that it alternately turns on the first switching device and the second switching device, more specifically, turns off the first switching device before turning on the second switching device.

50 Claims, 24 Drawing Sheets

POWER SUPPLY DEVICE AND FIXING DEVICE OPERATING WITH THE POWER SUPPLY DEVICE

BACKGROUND OF THE INVENTION

1. Field of the Invention

The present invention relates to a power supply device that may be applied to a heating device of electromagnetic inducting heating type, or the like, and also relates to a fixing device that uses the heating device for fixing images in an image forming apparatus.

2. Description of Related Art

Image heating devices (or fixing devices) have been conventionally installed in image forming apparatuses. In a known example that will be discussed below, a fixing device is installed in an image forming apparatus, such as a copying machine or a printer, for the purpose of heating and fixing a toner image on a recording medium.

In image forming apparatuses wherein an unfixed image (toner image) of desired image information is formed by a transfer method or direct method on a recording medium or material (such as a transfer sheet, electrofax sheet, electrostatic recording paper, OHP sheet, printing paper, or format paper), by a suitable image forming process, such as an electrophotographic process, electrostatic recording process, or a magnetic recording process, heat roller type devices were widely used as fixing devices for heating and fixing the unfixed image (toner image) on the surface of the recording medium, to provide a permanent fixed image. More recently, belt heating type fixing devices have been used in practice in view of quick start and energy conservation. Electromagnetic induction heating type devices are also proposed. In the following description, various types of fixing devices used in image forming apparatuses will be explained.

(a) Fixing Device of Heat Roller Type

A fixing device of heat roller type is basically constituted by a pair of rollers, i.e., a fixing roller (heating roller) and a pressure roller that are in pressed contact with each other. With the pair of rollers being rotated, a recording medium that carries an unfixed toner image thereon is nipped and transported by a fixing nip portion at which the rollers are in pressed contact with each other, so that the unfixed toner image is fixed on the surface of the recording medium, utilizing the heat of the fixing roller and the pressing force of the fixing nip portion.

The fixing roller generally has a hollow metal roller made of aluminum, as a base (core), and a halogen lamp as a heat source which is inserted into and placed in the aluminum roller. In operation, the halogen lamp generates heat for heating the fixing roller, and electric power to be supplied to the halogen lamp is controlled so that the outer peripheral surface of the roller is maintained at a certain fixing temperature.

In particular, a fixing device of an image forming apparatus adapted for forming full-color images is required to have an ability to sufficiently heat and fuse a maximum of four layers of toner images to mix different colors. To this end, the core of the fixing roller is made of a material having a large thermal capacity, and a rubber elastic layer is provided on the outer periphery of the core, for surrounding and uniformly fusing a toner image, so that the toner image is heated via the rubber elastic layer. A heat source is placed in a pressure roller as well as in a fixing roller (heating roller), and the pressure roller is heated with its temperature being suitably controlled.

The fixing device of heat roller type as described above, however, has a disadvantage as follows: when the power supply of the image forming apparatus is turned on, and the halogen lamp as the heat source of the fixing device starts being energized at the same time, it requires a considerably long time (waiting time) for the fixing roller having a large thermal capacity and other components to be heated from a totally cold state to a certain temperature that enables fixing. Thus, the fixing device of heat roller type has a poor quick start capability. Also, there is a need to energize the halogen lamp to keep the fixing roller in a certain temperature controlled state while the image forming apparatus is being in the standby state (i.e., while images are not being generated), so that the image forming operations can be carried out at any time. Thus, the fixing device of this type suffers from a large amount of power consumption.

In the case of the fixing device of the above-described full-color image forming apparatus, which uses a fixing roller having a large thermal capacity, an increase in the temperature at the surface of the fixing roller is delayed relative to the desired timing of temperature control, thus causing poor fixing, gloss variations, offset and other problems.

(b) Fixing Device of Film Heating Type

Fixing devices of film heating type have been proposed in, for example, Laid-open Japanese Patent Publications (Kokai) Nos. 63-313182, 2-157878, 4-44075 and 4-204980.

The fixing device of the above type is constructed such that a heat resistant film (fixing film) is sandwiched between a ceramic heater as a heating body and a pressure roller as a pressure member, to thus form a nip portion. A recording medium that carries an unfixed toner image thereon is pinched or nipped between the film and the pressure roller in the nip portion, and fed along with the film. In this manner, heat generated by the ceramic heater is transferred to the recording medium via the film in the nip portion, and the unfixed toner image is thermally fixed onto the surface of the recording medium, using the heat and the pressing force of the nip portion.

The fixing device of film heating type may be constructed as that of on demand type, by using a ceramic heater and a film both having a low thermal capacity. In operation, the ceramic heater as a heat source is energized only during execution of the image forming process of the image forming apparatus, so as to heat the fixing device to a certain fixing temperature. Thus, the fixing device of this type is advantageous in a relatively short waiting time (improved quick start ability) as measured from the turn-on of the power supply of the image forming apparatus until the apparatus is ready to execute the image forming process, and also advantageous in significantly reduced power consumption (power saving) during standby. The fixing device, however, has a difficulty in terms of the thermal capacity when it is used in full-color image forming apparatuses or high-speed machines.

(c) Fixing Device of Electromagnetic Inducting Heating Type

Laid-open Publication No. 51-109739 of Japanese Utility Model Application discloses an induction heating type fixing device in which magnetic flux is used for inducing current in a fixing roller, thereby to generate heat in the form of Joule heat. This type of fixing device makes it possible to directly heat the fixing roller by utilizing induction current, thus achieving a highly efficient fixing process, as compared with the fixing device of heat roller type which uses a halogen lamp as a heat source.

In the fixing device of the induction heating type, however, the energy of alternating magnetic flux generated by an exciting coil serving as magnetic field generating means is used for increasing the temperature of the whole fixing roller, resulting in an increased heat radiation loss, and a reduced ratio of the fixing energy to the energy put into the system, or reduced efficiency.

In view of the above problem, a highly efficient fixing device has been proposed in which the exciting coil is located close to the fixing roller as a heat generating body so as to provide the energy for fixing with a high efficiency, or the distribution of alternating magnetic flux of the exciting coil is concentrated at around the fixing nip portion.

Referring to FIG. 24, one example of fixing device of electromagnetic induction heating type will be briefly described wherein the distribution of alternating magnetic flux of the exciting coil is concentrated at around the fixing nip portion so as to improve the efficiency.

In FIG. 24, reference numeral 10 denotes a cylindrical fixing film (fixing belt) which serves as a rotator capable of generating heat due to electromagnetic induction, and which has an electromagnetic induction heat generating layer (conductive layer, magnetic layer, resistive layer). The cylindrical fixing film 10 is loosely disposed around a gutter-like film guide (belt guide) member having a substantially semi-circular shape in transverse cross section. Magnetic field generating means 15 that is disposed inside the film guide member 16 is comprised of an exciting coil 18 and an E-shaped magnetic core (core member) 17. An elastic pressure roller 30 is in pressed contact with the lower surface of the film guide member 16 under a certain pressure, with the fixing film 10 sandwiched between the pressure roller 30 and the film guide member 16, to thus form a fixing nip portion N having a certain width. The magnetic core 17 of the magnetic field generating means 15 is located in alignment with the fixing nip portion N.

The pressure roller 30 is driven by driving means M to rotate in the counterclockwise direction as indicated by an arrow in FIG. 24. A force is applied to rotate the fixing film 10 due to the frictional force that arises between the pressure roller 30 and the outer surface of the fixing film 10 as a result of the rotary movement of the pressure roller 30. Thus, the fixing film 10 is caused to rotate around the belt guide member 16 in the clockwise direction as indicated by an arrow in FIG. 24, at a peripheral velocity substantially equal to the peripheral velocity of rotation of the pressure roller 30, while the inner surface of the fixing film 10 is sliding along the adhering lower surface of the film guide member 16 in the fixing nip portion N.

The film guide member 16 functions to apply a pressure to the fixing nip portion N, support the exciting coil 18 and magnetic core 17 as magnetic field generating means 15, support the fixing film 10, and provide sufficient transport stability during rotation of the fixing film 10. The film guide member 16 is an insulating member that inhibits passage of magnetic flux therethrough, and is formed of a material that is able to stand a heavy load.

The exciting coil 18 generates alternating magnetic flux when alternating current is supplied from an exciting circuit (not shown) to the coil 18. The E-shaped magnetic core 17 causes the alternating magnetic flux to be concentrated in the fixing nip portion N, and the alternating magnetic flux causes eddy current to flow through the electromagnetic induction heat generating layer of the fixing film 10 in the fixing nip portion N. With the eddy current thus produced, the electromagnetic induction heat generating layer generates Joule heat due to the specific resistance of the heat generating layer.

The heat generation of the fixing film 10 due to electromagnetic induction occurs and is concentrated at the fixing nip portion N in which the alternating magnetic flux is highly distributed or concentrated, so that the fixing nip portion N is heated with a high efficiency. To control the temperature of the fixing nip portion N, current to be supplied to the exciting coil 18 is controlled by a temperature control system including a temperature detecting device (not shown) so that the temperature of the fixing nip portion N is maintained at a certain temperature.

As described above, the pressure roller 30 is driven or rotated, and the cylindrical fixing film 10 is rotated around the film guide member 16, while electric power is supplied from the exciting circuit to the exciting coil 18 so that the fixing nip portion N is heated to a certain target temperature by heat generation of the fixing film 10 due to electromagnetic induction, and maintained at the target temperature. In this state, a recording medium P on which an unfixed toner image "t" is formed and which is fed from an image forming portion (not shown) is introduced into the fixing nip portion N to be nipped between the fixing film 10 and the pressure roller 30, with its image carrying surface facing upward, i.e., toward the surface of the fixing film. The image carrying surface of the recording medium adheres to the outer surface of the fixing film 10 in the fixing nip portion N, and the recording medium P and the fixing film 10 are fed through the fixing nip portion N while being nipped between the film guide member 16 and the pressure roller 30.

While the recording medium P is being fed along with the fixing film 10 through the fixing nip portion N, the recording medium P is heated due to electromagnetic induction of the fixing film 10, and the unfixed toner image "t" on the recording medium P is heated and fixed. After passing through the fixing nip portion N, the recording medium P is separated from the outer surface of the rotating fixing film 10, and continues to be transported.

Inverter circuits used in power supplies for electromagnetic induction heating constructed as above are roughly classified into those of current resonance type and those of voltage resonance type. The resonance method is employed for the reason as follows: where a relatively large electric power is to be handled, an oscillating state of voltage or current that occurs upon switching of a switching device for conversion is positively or deliberately produced so as to reduce loss of the switching device, and the switching device is turned on/off when the voltage or current or both is at the lowest level. This method is called "soft switching", which is the most effective method when handling large electric power, and various methods have been proposed.

FIG. 25 shows an inverter circuit of voltage resonance type as a known example. The inverter circuit includes a switching device 202, a resonance coil (exciting coil) 203, and a resonating capacitor 205. In the operation of the known voltage resonance inverter, when the switching device 202 is turned off after the device 202 is turned on and electric power is stored in the resonance coil 203, the voltage starts oscillating while drawing an arc of resonance, with a frequency that is determined by the constants of the resonance coil 203 and the resonating capacitor 205.

In FIG. 26, 208 indicates the gate voltage waveform of the switching device 202, and 210 indicates the current waveform of the switching device 202 and a diode 207, while 211 indicates the voltage waveform of the switching device 202.

FIG. 27 shows the operating waveform when the ON duration of the gate switching signal is shortened so as to restrict output power, and a power converting operation is performed. The voltage waveform 211 of the switching device 202 when the output power is restricted shows a sine wave that resonates about the power supply voltage (whose level is indicated by a broken line) as a reference, with the power supply being connected to the terminal of the resonance coil 203. The oscillation amplitude of the voltage depends upon the exciting electric power stored in the resonance coil (exciting coil) 203, namely, the ON duration of the switching signal of the switching device 202. The oscillation amplitude is small during a power-saving operation, and the voltage is not sufficiently lowered from the level of the power supply voltage, and fails to cross zero.

Namely, the switching device 202 performs switching of a considerably low-impedance load of the resonating capacitor 205 via the power supply line, and excessively large current is caused to flow through the switching device 202 upon turn-on. With the voltage resonance power supply, the range in which the switching device 202 does not break down can be only restricted to about ⅓ of the maximum output due to the excessively large current, which makes it difficult to design the circuit.

The following problems, however, have occurred in the prior art as described above. In general, the required width of the electric power control region used by the fixing heating device installed in the image forming apparatus is 1100 W to 150 W. While the operating methods of induction heating power supplies proposed by the present invention are roughly classified into a current resonance method and a voltage resonance method, and the voltage resonance method that can be realized with a simple configuration is widely employed.

In the electric power control according to the conventional voltage resonance method, the power can be restricted to about one-third of the maximum output, namely, down to 350 W in the above example. If the power is to be further restricted, the fixing device is no longer held in the voltage resonance state, and large current flows through the switching device and breaks down the device.

If fixing control is performed with the power supply as described above in the image forming apparatus, the power of 350 W is excessively large while the fixing device is in the temperature saturated state during continuous printing, and the circuit performs intermittent operations. Under the control performed with such intermittent operations, the temperature tends to be unstable, and the voltage resonance circuit, which is formed of a parallel circuit of a resonating capacitor and a coil, has excessively large current flowing therethrough upon start, which current gives stress to the switching device.

As an electric circuit for heating control according to the electromagnetic induction heating method, a voltage resonance circuit is known which is comprised of a switching device that is connected in series with an exciting coil, a resonating capacitor that is connected in parallel with the switching device, and a filter capacitor provided in the later stage of an AC line voltage rectifier. With the voltage resonance circuit thus constructed, the switching device is turned on/off when the voltage applied to the switching device becomes equal to "0", utilizing flyback voltage that is generated by the parallel resonance circuit of the coil and capacitor.

In the voltage resonance circuit as described above, however, where the output power is small, namely, where the energy per pulse is small, the magnitude of the flyback voltage is not sufficient, and soft switching operations cannot always be expected.

SUMMARY OF THE INVENTION

It is therefore an object of the present invention to provide a power supply device and a voltage resonance method which are free from the drawbacks as described above.

Another object of the present invention is to provide a power supply device and a voltage resonance method which are free from a reduced switching loss.

A further object of the present invention is to provide a power supply device and a voltage resonance method which are free from the situation in which soft switching operations for generating an alternating magnetic field cannot be executed.

A still further object of the present invention is to provide a fixing device that employs the power supply device and voltage resonance method as described above.

To attain the above objects, according to a first aspect of the present invention, there is provided a power supply device comprising a first switching device, a first charging device connected in series with the first switching device, a second switching device connected in series with the first charging device, a magnetic field generating device that is connected between a power supply line and a node between the first charging device and the second switching device, a second charging device connected in parallel with the second switching device, a first rectifying device connected in parallel with the first switching device, a second rectifying device connected in parallel with the second switching device, and a switching control circuit that controls driving of the first and second switching devices.

To attain the above objects, according to a second aspect of the present invention, there is provided a power supply device, comprising a first switching device, a first charging device connected in series with the first switching device, a second switching device connected in series with the first charging device, a magnetic field generating device that is connected between a node of the first charging device and the second switching device, and a power supply line, a second charging device connected in parallel with the magnetic field generating device, a first rectifying device connected in parallel with the first switching device, a second rectifying device connected in parallel with the second switching device, and a switching control circuit that controls driving of the first and second switching devices.

In the power supply device according to the first and second aspects, the switching control circuit alternately turns on the first switching device and the second switching device.

More specifically, the switching control circuit turns off the first switching device before turning on the second switching device.

The magnetic field generating device and the first charging device constitute a first resonance circuit, and the magnetic field generating device and the second charging device constitute a second resonance circuit.

Preferably, the second charging device has a capacity that is sufficiently smaller than that of the first charging device.

In a typical application of the present invention, the power supply device is provided in a heat generating device that generates heat utilizing electromagnetic induction of the magnetic field generating device.

The power supply device can be advantageously used in an image recording apparatus that employs an electrophotographic recording method, in which the heat generating device is a fixing device of the image recording apparatus.

To attain the above objects, according to a third aspect of the present invention, there is provided a voltage resonance method for use in a power supply device comprising a first switching device, a first charging device connected in series with the first switching device, a second switching device connected in series with the first charging device, a magnetic field generating device that is connected between a power supply line and a node between the first charging device and the second switching device, a second charging device connected in parallel with the second switching device, a first rectifying device connected in parallel with the first switching device, and a second rectifying device connected in parallel with the second switching device, the voltage resonance method comprising the steps of turning on the first switching device, turning off the first switching device before turning on the first switching device, and turning on the second switching device after turning off the first switching device.

To attain the above objects, according to a fourth aspect of the present invention, there is provided a voltage resonance method for use in a power supply device comprising a first switching device, a first charging device connected in series with the first switching device, a second switching device connected in series with the first charging device, a magnetic field generating device that is connected between a power supply line and a node between the first charging device and the second switching device, a second charging device connected in parallel with the magnetic field generating device, a first rectifying device connected in parallel with the first switching device, and a second rectifying device connected in parallel with the second switching device, the voltage resonance method comprising the steps of turning on the first switching device, turning off the first switching device before turning on the second switching device, and turning on the second switching device after turning off the first switching device.

In a typical application of the present invention, the voltage resonance method according to the third and fourth aspects may be applied to a power supply device that is provided in a heat generating device that generates heat utilizing electromagnetic induction of the magnetic field generating device.

The voltage resonance method according to the present invention can be advantageously applied to an image recording apparatus that employs an electrophotographic recording method, in which the heat generating device is a fixing device of the image recording apparatus.

To attain the above objects, according to a fifth aspect of the present invention, there is provided a power supply device comprising a magnetic field generating device, a first switching device connected in series with the magnetic field generating device, a first charging device connected in series with the first switching device, a second switching device connected in parallel with a line on which the first switching device and the first charging device are connected in series, a second charging device connected in parallel with the second switching device, a first rectifying device connected in parallel with the first switching device, a second rectifying device connected in parallel with the second switching device, and a switching control circuit that controls driving of the first and second switching devices.

Preferably, the power supply device according to the fifth aspect further comprises a power detecting circuit that detects electric power supplied to the magnetic field generating device, and wherein the switching control circuit turns on the first switching device before turning on the second switching device, depending upon the electric power detected by the power detecting circuit.

More preferably, the power detecting circuit detects current that flows through the first switching device.

Preferably, the power supply device according to the fifth aspect further comprises a voltage detecting circuit that detects flyback voltage that appears in the magnetic field generating device, and wherein the switching control circuit turns on the first switching device before turning on the second switching device when the flyback voltage detected by the voltage detecting circuit is equal to or smaller than a predetermined value.

Further preferably, the power supply device according to the fifth aspect further comprises a voltage detecting circuit that detects a voltage of a power supply line, and a temperature detecting circuit that detects a temperature of a heat generating body that generates heat utilizing a magnetic field generated by the magnetic field generating device, and wherein the switching control circuit turns on the first switching device before turning on the second switching device when the voltage detected by the voltage detecting circuit is equal to or larger than a predetermined value, and an ON duration of the second switching device is reduced to be smaller than a predetermined value while the heat generating body is maintained at a predetermined temperature based on an output of the temperature detecting circuit.

Alternatively, the power supply device according to the fifth aspect further comprises a current detecting circuit that detects current that flows through the first rectifying device, and a temperature detecting circuit that detects a temperature of a heat generating body that generates heat utilizing a magnetic field generated by the magnetic field generating device, and wherein the switching control circuit turns on the first switching device before turning on the second switching device when the current detected by the current detecting circuit is equal to or larger than a predetermined value, and an ON duration of the second switching device is reduced to be smaller than a predetermined value while the heat generating body is maintained at a predetermined temperature based on an output of the temperature detecting circuit.

Other objects of the invention will become apparent from the following description based on the accompanying drawings, and the appended claims.

DETAILED DESCRIPTION OF THE PREFERRED EMBODIMENTS

Some preferred embodiments of the present invention will be described with reference to the drawings.

<First Embodiment>

(1) Image Forming Apparatus

Initially, an example of image forming apparatus that employs a power supply device constructed according to the present invention will be described.

Figure 2:
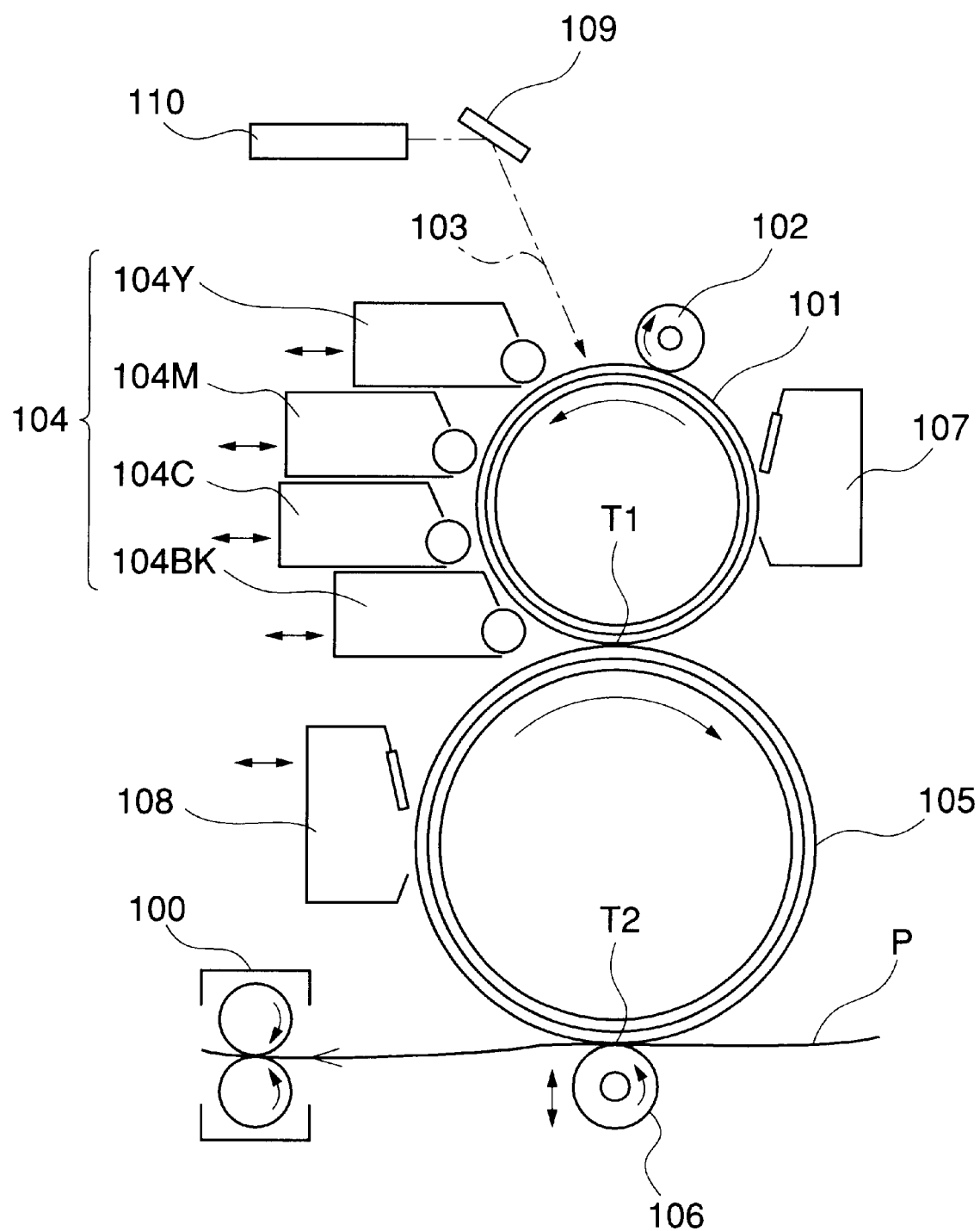
FIG. 2 a view showing the construction of the image forming apparatus to which the present invention may be applied.

FIG. 2 shows the construction of an image forming apparatus to which the present invention may be applied. While the image forming apparatus takes the form of, for example, an electrophotographic color printer in the present embodiment, the present invention is not limited to this type of image forming apparatus. The image forming apparatus includes a fixing device (image heating device) 100, photosensitive drum (image bearing member) 101, charging device 102, four-color development device 104, intermediate transfer drum 105, transfer roller 106, cleaner 107, mirror 109, and a laser optical box (laser scanner) 110.

The structure and operation of each of the above components will be described in detail. The photosensitive drum 101 is composed of an organic photosensitive member or an amorphous silicon photosensitive member, and is adapted to be driven so as to rotate at a certain process speed (peripheral velocity) in the counterclockwise direction as indicated by an arrow in FIG. 2. The photosensitive drum 101 is uniformly electrically charged with a certain polarity and a certain potential by means of the charging device 102, such as a charging roller, while the drum 101 is rotating. The photosensitive drum 101 is then subjected to a scanning exposure operation so that its charged surface receives desired image information carried by a laser beam 103 that is emitted by the laser optical box 110. The laser optical box 110 is adapted to emit the laser beam 103 that has been modulated (on/off) in response to a time-series electric digital pixel signal of image information received from an image signal generating apparatus (not shown), such as an image reading apparatus. With the scanning exposure using the laser beam, a latent image corresponding to the desired image information is formed on the surface of the rotating photosensitive drum 10. The mirror 109 serves to deflect the laser beam emitted by the laser optical box 110 toward the exposure position of the photosensitive drum 101.

In the case where a full-color image is to be formed, scanning exposure and latent image formation are initially conducted with respect to a first color component image, e.g., yellow component image, of the full-color image, and the resulting latent image is developed by a yellow development device 104Y of the four-color development unit 104, so as to form a yellow toner image. The yellow toner image is then transferred onto the surface of the intermediate transfer drum 105 at a primary transfer portion T1 at which (or in the vicinity of which) the photosensitive drum 101 and the intermediate transfer drum 105 are in contact with each other. After the transfer of the toner image on the intermediate transfer drum 105, the cleaner 107 cleans the surface of the rotating photosensitive drum 101 by removing residues including toner that remains on the surface without being transferred.

The above-described process cycle of charging, scanning exposure, development, primary transfer and cleaning is successively executed with respect to each color component image of the desired full-color image, i.e., a second color component image (for example, a magenta component image to be developed by a magenta development device 104M), a third color component image (for example, a cyan component image to be developed by a cyan development device 104C), and a fourth color component image (for example, a black component image to be developed by a black development device 104BK). As a result, four-color toner images, namely, an yellow toner image, magenta toner image, cyan toner image and a black toner image, are successively laminated and transferred onto the surface of the intermediate transfer drum 105, thereby to form a color toner image corresponding to the desired full-color image.

The intermediate transfer drum 105 has a medium-resistance elastic layer and a high-resistance surface layer formed on a metallic drum thereof. In operation, the intermediate transfer drum 105 is driven to rotate in the clockwise direction as indicated by an arrow in FIG. 2, at substantially the same peripheral velocity as that of the photosensitive drum 101, while it is kept in contact with or located close to the photosensitive drum 101. With a bias potential being given to the metallic drum of the intermediate transfer drum 105, the toner image on the photosensitive drum 101 is transferred onto the surface of the intermediate transfer drum 105 due to a potential difference between the transfer drum 105 and the photosensitive drum 101.

The composite color toner image formed on the surface of the intermediate transfer drum 105 as described above is transferred onto a recording medium P at a secondary transfer portion T2 that is a contact nip portion formed between the intermediate transfer drum 105 and the transfer roller 106, while the recording medium P is being fed in certain timing from a paper feeding unit (not shown) to the secondary transfer portion T2. The transfer roller 106 supplies electric charges of a polarity opposite to that of the toner, from the back surface of the recording medium P, thereby to transfer the composite color toner image at a time from the surface of the intermediate transfer drum 105 to the recording medium P. The recording medium P, which has passed through the secondary transfer portion T2, is separated or released from the surface of the intermediate transfer drum 105, and guided into the fixing device (image heating device) 100 so that an unfixed toner image is subjected to a heating/fixing process. The resulting recording medium on which a color image is formed is then ejected onto an external paper tray that is not illustrated. The fixing device (image heating device) 100 will be described later in greater detail.

After the color toner image is transferred from the intermediate transfer drum 105 to the recording medium P, a cleaner 108 cleans the transfer drum 105 by removing residues, such as remaining toner and paper powder, which are attached to the surface of the drum 105. The cleaner 108 is normally held in a non-contact state in which it does not contact with the intermediate transfer drum 105, but held in contact with the transfer drum 105 during the secondary transfer of the color toner image from the transfer drum 105 to the recording medium P. The transfer roller 106 is also normally held in a non-contact position relative to the intermediate transfer drum 105, but held in contact with the transfer drum 105 via the recording medium P, during the secondary transfer of the color toner image from the transfer drum 105 to the recording medium P.

The image forming apparatus of the present embodiment may also operate in a printing mode for printing mono-color images, such as black-and-white images. The present apparatus may further operate in a perfect image printing mode (or both-side printing mode) or multiple image printing mode. In the perfect printing mode, the recording medium P which has an image printed on a first side thereof is ejected from the fixing device (image heating device) 100, reversed or flipped over, and then fed back to the secondary transfer portion T2 through a circulating feed mechanism (not shown). A toner image for a second side of the recording medium P is then transferred to the recording medium P, which is then guided into the fixing device (image heating device) 100 so that the toner image for the second side is subjected to a fixing process. In this manner, a both-side image print having images formed on both sides thereof is produced.

In the multiple image printing mode, on the other hand, the recording medium P that has a first image printed thereon is ejected from the fixing device (image heating device) 100, and fed back to the secondary transfer portion T2 through the circulating feed mechanism (not shown) without being reversed or flipped over. A second toner image is then transferred onto the side of the recording medium P on which the first image has been printed, and the recording medium P is then guided into the fixing device (image heating device) 100 so that the second toner image is subjected to a fixing process. In this manner, a multiple image print on which a plurality of images are printed is produced.

(2) Fixing Device (Image Heating Device) 100

Figure 3:
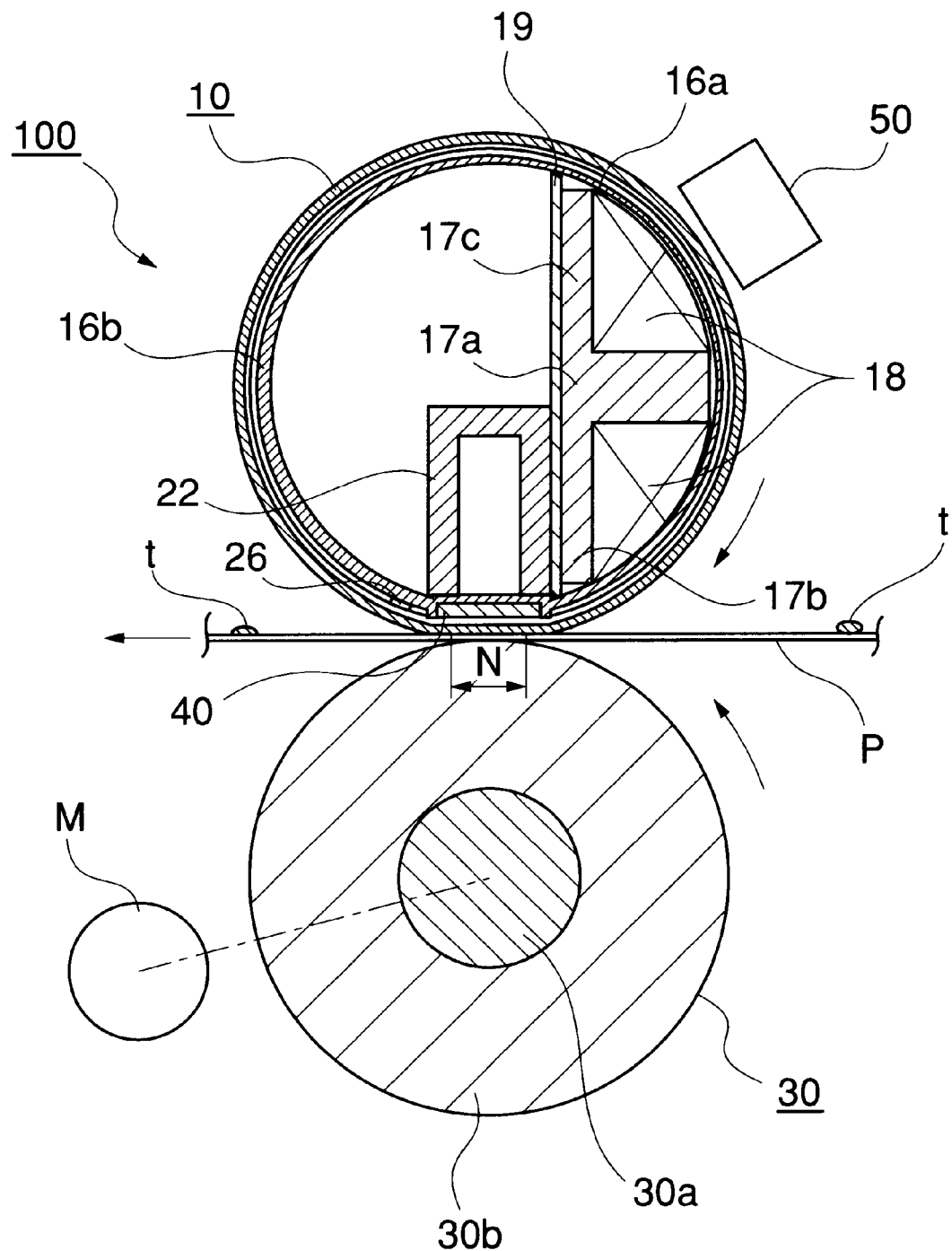
FIG. 3 is a view showing a transverse cross section of essential parts of a fixing device used in the image forming apparatus of FIG. 2.
Figure 4:
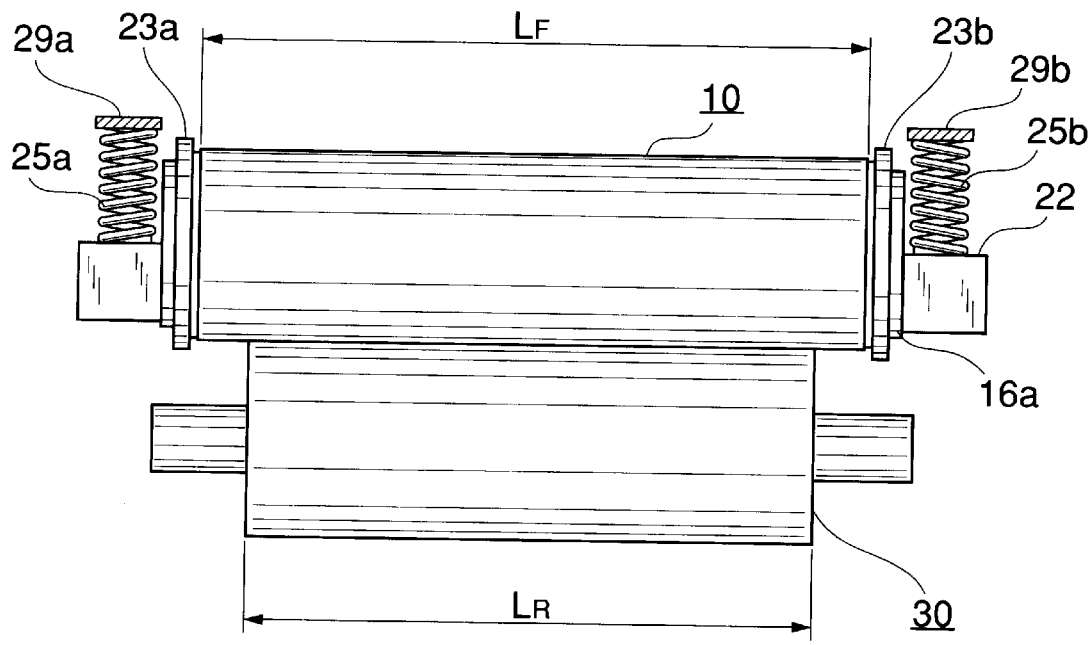
FIG. 4 is a front view showing essential parts of the fixing device.
Figure 5:
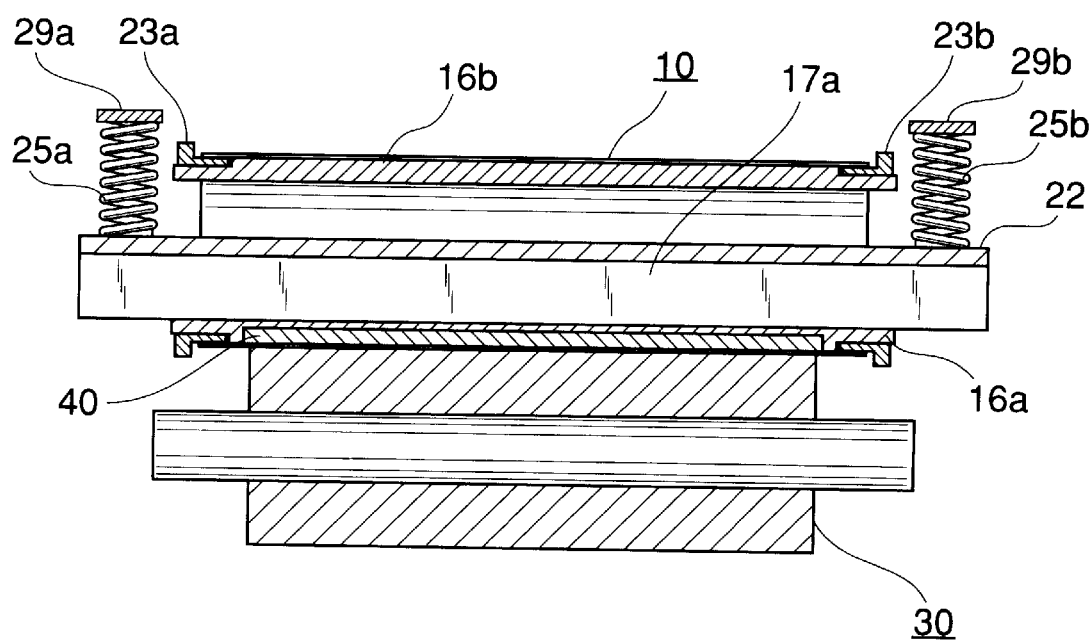
FIG. 5 is a a front elevational view showing the essential parts of the fixing device in vertical cross section.

Next, the fixing device (image heating device) 100 of the image forming apparatus as described above will be explained. The fixing device (image heating device) 100 of the present embodiment is of pressure-roller driving type and electromagnetic induction heating type, using an electromagnetic induction heat generating belt having a cylindrical shape. FIG. 3 is a cross-sectional view showing the construction of essential parts of the fixing device used in the image forming apparatus constructed as described above. FIG. 4 is a front view showing the construction essential parts of the fixing device as viewed from the front side thereof, and FIG. 5 is a front elevational view showing the construction of the principal part of the fixing device in vertical cross section.

Figure 6:
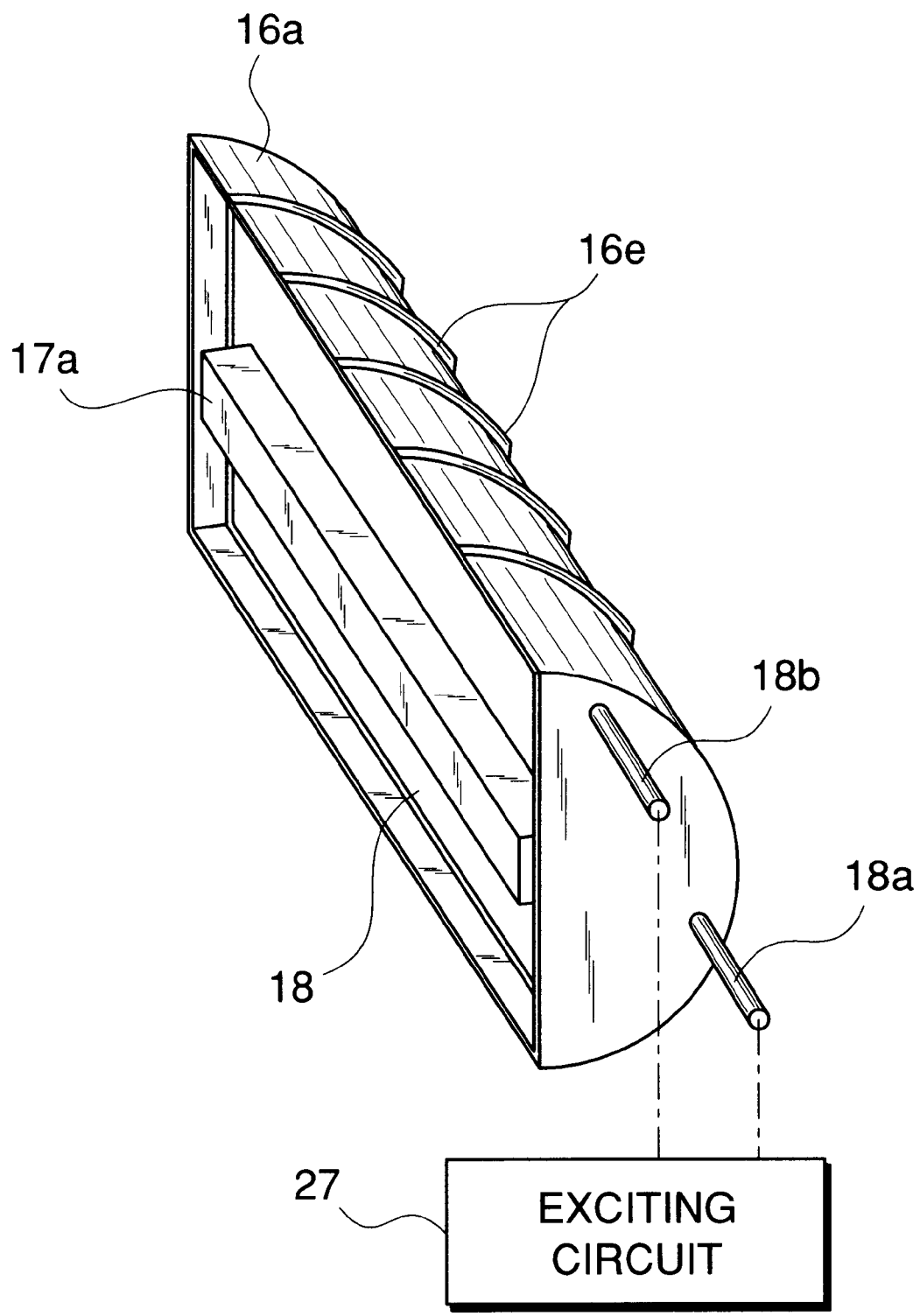
FIG. 6 is a perspective view showing a belt guide member, exciting coil and others of the fixing device.

The structure of each component of the fixing device (image heating device) 100 will be described in detail. A magnetic field generating means is composed of magnetic cores 17a, 17b, 17c and an exciting coil 18. The magnetic cores 17a, 17b, 17c have high permeability, and are preferably formed of a material, such as ferrite or permalloy, which is generally used for cores of transformers. It is more preferable to use ferrite that has a small loss even at 100 KHz or higher. As shown in FIG. 6, the exciting coil 18 has feed portions 18a, 18b to which an exciting circuit 27 is connected. The exciting circuit 27 is adapted to generate a high-frequency wave of 20 KHz to 500 KHz with a switching power supply. The exciting coil 18 generates alternating magnetic flux, in response to alternating current (high-frequency current) supplied from the exciting circuit 27.

The fixing device (image heating device) 100 includes gutter-like belt guide members 16a, 16b having a generally semicircular cross section, which are opposed to each other with their openings facing each other, to provide a generally columnar structure. A fixing belt 10 in the form of a cylindrical, electromagnetic induction type heat generating belt is loosely mounted on the outer surfaces of the guide members 16a, 16b. The belt guide member 16a supports or holds therein the magnetic cores 17a, 17b and 17c and exciting coil 18 serving as magnetic field generating means. The belt guide member 16a is provided with a high-thermal-conductivity member 40 that extends in the longitudinal direction perpendicular to the plane of the sheet of FIG. 5, such that the member 40 is located inside the fixing belt 10, to face the pressure roller 30 in the nip portion N. In the present embodiment, the high-thermal-conductivity member 40 is made of aluminum, and has a thickness of 1 mm. The thermal conductivity "k" of the high-thermal-conductivity member 40 is equal to 240 $[W \cdot m^{-1} \cdot K^{-1}]$.

The high-thermal-conductivity member 40 is disposed outside a magnetic field that is generated by the exciting coil 18 and magnetic cores 17a, 17b, 17c as the magnetic field generating means, so as not to be affected by the magnetic field. More specifically, the high-thermal-conductivity member 40 is spaced from the exciting coil 18 with the magnetic core 17c interposed therebetween, to be thus located outside a magnetic path produced by the exciting coil 18, so that the exciting coil 18 has no influence upon the high-thermal-conductivity member 40.

Reference numeral 22 denotes an elongate, rigid stay that is disposed in abutting contact with a flat portion of the inner surface of the belt guide member 16b. Reference numeral 19 denotes an insulating member for insulating the magnetic cores 17a, 17b, 17c and exciting coil 18 from the rigid stay 22 for pressing the belt guide member 16b. Flange members 23a, 23b are fitted on longitudinally opposite end portions of the assembly of the belt guide members 16a, 16b, and freely rotatably attached at the longitudinal opposite end portions to fix the same in place, such that the flange members 23a, 23b receive end portions of the fixing belt 10 during rotation thereof, so as to limit movement of the fixing belt 10 in the longitudinal direction of the belt 10.

The pressure roller 30 serving as a pressure member is composed of a core bar 30a, and a heat-resistant, elastic layer 30b made of silicone rubber, fluorine, or fluororesin. The core bar 30a is covered with the elastic layer 30b that is formed in a roller-like shape, concentrically with the core bar 30a, and opposite end portions of the core bar 30 are rotatably supported via bearings by metal sheets (not shown) on the chassis or frame of the apparatus. Pressure springs 25a, 25b that are in a compressed state are provided between opposite end portions of the rigid stay 22 and spring receiving members 29a, 29b mounted on the chassis of the apparatus, so as to apply a force to push down the rigid stay 22. With this arrangement, the lower surface of the belt guide member 16a is pressed against the upper surface of the pressure roller 30 with the fixing belt 10 interposed therebetween, so that a fixing nip portion N having a certain width is formed between the roller 30 and the fixing belt 10.

The pressure roller 30 is rotated or driven by driving means M in the counterclockwise direction as indicated by an arrow in FIG. 3. A force is applied to rotate the fixing belt 10 due to the frictional force that arises between the pressure roller 30 and the outer surface of the fixing belt 10 as a result of the rotation of the pressure roller 30. Thus, the fixing belt 10 is caused to rotate around the belt guide members 16a, 16b in the clockwise direction as indicated in FIG. 3, at a peripheral velocity substantially equal to the peripheral velocity of rotation of the pressure roller 30, while an inner surface of the fixing belt 10 is sliding along the adhering lower surface of the high-thermal-conductivity member 40 in the fixing nip portion N.

In the above case, a lubricant, such as high-temperature grease, is interposed between the lower surface of the high-thermal-conductivity member 40 and the inner surface of the fixing belt 10 in the fixing nip portion N, so as to reduce a frictional force arising due to sliding actions between the lower surface of the high-thermal-conductivity member 40 and the inner surface of the fixing belt 10 in the fixing nip portion N. Alternatively, the lower surface of the high-thermal-conductivity member 40 may be covered with a lubricating member. The use of the lubricant or lubricating member prevents the sliding fixing belt 10 from being damaged, thus avoiding degradation of the durability of the fixing belt 10, particularly when the high-thermal-conductivity member 40 is made of aluminum or other material having a poor surface lubricating property, or finishing is simplified.

The high-thermal-conductivity member 40 is effective to provide a uniform temperature distribution in the longitudinal direction. Where a small piece of paper passes through the fixing device, for example, heat generated at a portion of the fixing belt 10 through which the paper does not pass is transferred to the high-thermal-conductivity member 40, and transferred to a portion of the fixing belt 10 through which the small-sized paper passes, due to thermal conduction of the high-thermal-conductivity member 40 in the longitudinal direction. Thus, the power consumption can be advantageously reduced when a small piece of paper is passed through the fixing device.

As show in FIG. 6, ribs 16e are formed on the peripheral surface of the belt guide member 16a, to be spaced from each other at regular intervals in the longitudinal direction. The ribs 16e thus formed serve to reduce the resistance to sliding actions between the peripheral surface of the belt guide member 16a and the inner surface of the fixing belt 10, which results in a reduced load during rotation of the fixing belt 10.

Figure 7:
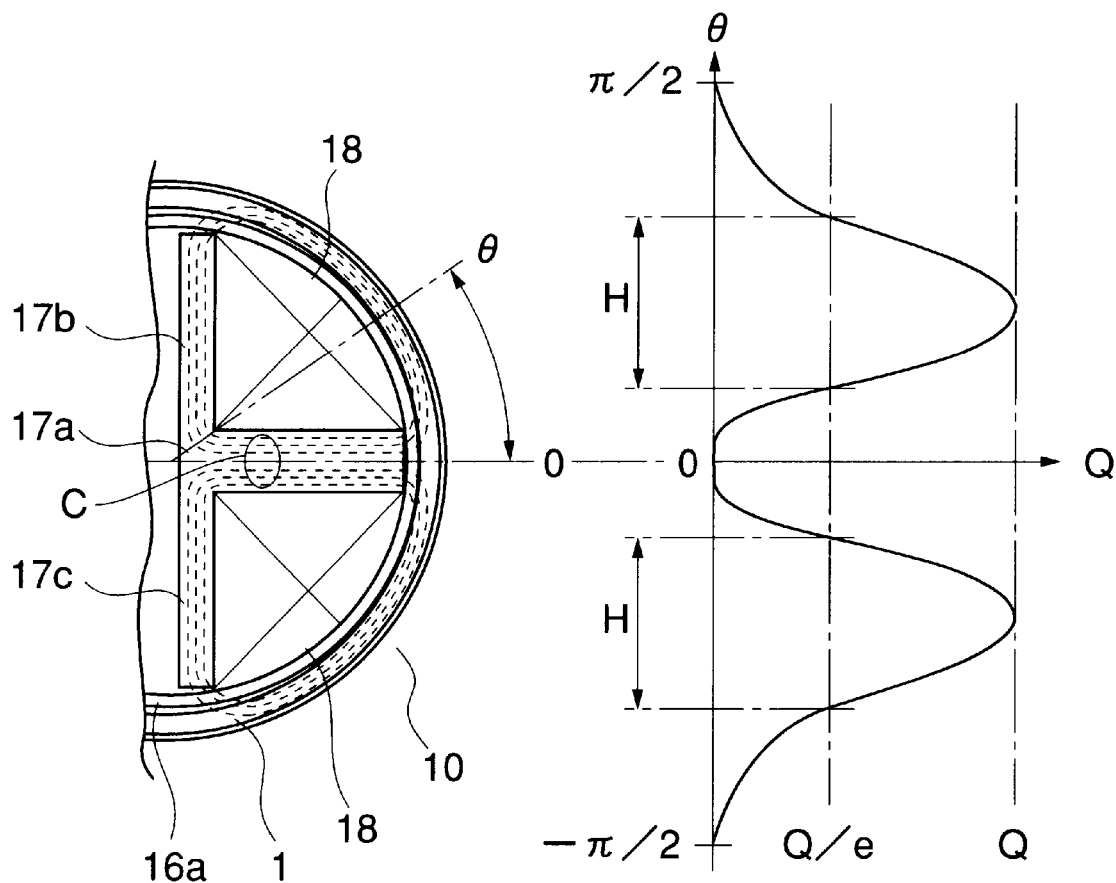
FIG. 7 is a view useful in explaining a manner of occurrence of alternating magnetic flux in a fixing belt of the fixing device.

FIG. 7 schematically represents the manner in which alternating magnetic flux occurs in the fixing device. In FIG. 7, "C" indicates a part of alternating magnetic flux that has appeared in the magnetic core. The alternating magnetic flux C that is guided along the magnetic cores 17a, 17b, 17c causes eddy current to be produced in the electromagnetic induction heat generating layer 1 of the fixing belt 10, between the magnetic core 17a and the magnetic core 17b, and between the magnetic core 17a and the magnetic core 17c. The eddy current thus produced causes Joule heat (eddy current loss) to be generated in the electromagnetic induction heat generating layer 1 depending upon the specific resistance of the heat generating layer 1.

The quantity of heat Q generated in the above manner is determined by the density of the magnetic flux that passes through the electromagnetic induction heat generating layer 1. FIG. 7 shows a graph representing the distribution of the quantity of heat Q, wherein the vertical axis indicates the position of the fixing belt 10 in the circumferential direction as represented by angle θ measured from the center of the magnetic core 17a (θ=0), and the horizontal axis indicates the quantity of heat Q generated in the electromagnetic induction heat generating layer 1 of the fixing belt 10. Here, the heat generation range H is defined as a region in which the quantity of heat is equal to or greater than Q/e where the maximum quantity of generated heat is Q. The quantity Q/e is that of heat required to accomplish fixing of toner images.

The temperature of the fixing nip portion N is controlled by a temperature control system including temperature detecting means (not shown), which controls current supplied to the exciting coil 18 thereby to maintain the nip portion N at a certain temperature. Reference numeral 26 in FIG. 3 denotes a temperature sensor, such as a thermistor, for detecting the temperature of the fixing belt 10. In the present embodiment, the temperature of the fixing nip portion N is controlled based on the temperature information of the fixing belt 10 measured by the temperature sensor 26.

In operation, the fixing belt 10 is rotated, and electric power is supplied from the exciting circuit 27 to the exciting coil 18, so as to generate heat in the fixing belt 10 due to electromagnetic induction, so that the fixing nip portion N is heated up to a certain temperature and maintained at a controlled temperature. In this state, the recording medium P on which an unfixed toner image "t" is formed is fed from the image forming unit, and guided into the fixing nip portion N between the fixing belt 10 and the pressure roller 30 such that the image bearing side of the medium P faces upwards, namely, toward the fixing belt face. As a result, the recording medium P adheres at its image bearing surface to the outer surface of the fixing belt 10 in the fixing nip portion N, and fed through the nip portion N along with the fixing belt 10 while being gripped between the fixing belt 10 and the pressure roller 30.

While the recording medium P is being fed through the fixing nip portion N along with the fixing belt 10, heat is generated in the fixing belt 10 due to electromagnetic induction, and the unfixed toner image "t" on the recording medium P is heated and fixed. The recording medium P, which has passed through the fixing nip portion N, is separated from the outer surface of the rotating fixing belt 10, and ejected. After passing through the fixing nip portion N, the thermally fixed toner image on the recording medium P is cooled down to provide a permanent fixed image.

In the present embodiment, a thermostatic switch 50 serving as a temperature detecting element is provided at a position that faces the heat generation range H (refer to FIG. 7) of the fixing belt 10, so as to cut off electric power supplied to the exiting coil 18 upon runaway.

Figure 8:
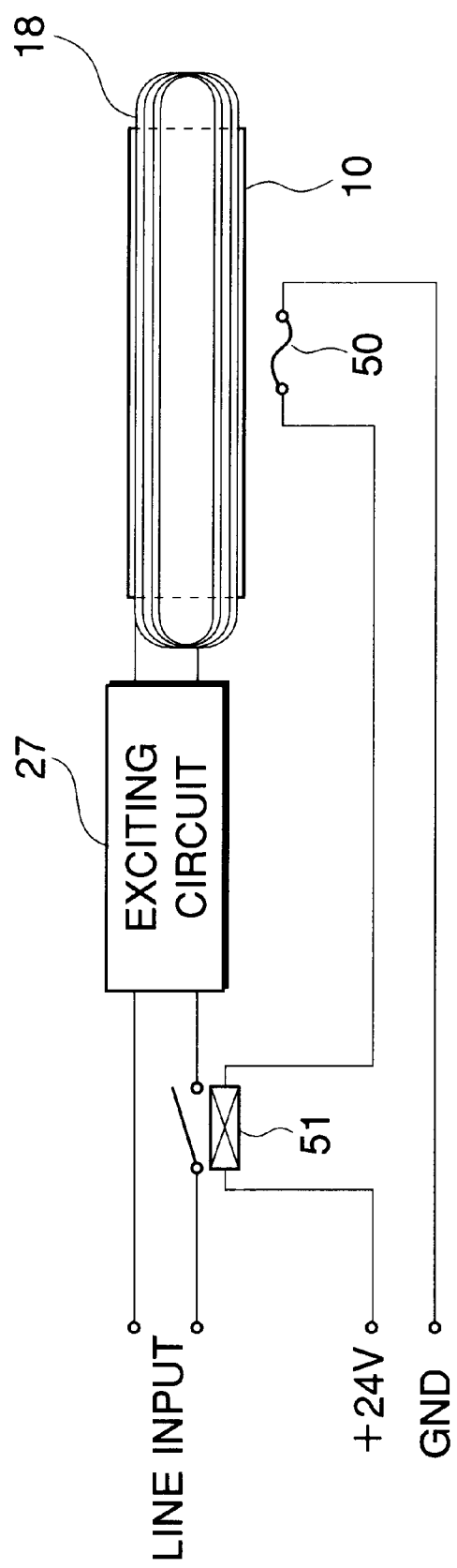
FIG. 8 is a circuit diagram showing a safety circuit of the image forming apparatus.

FIG. 8 is a circuit diagram showing a safety circuit used in the present embodiment. The thermostatic switch 50 as a temperature detector is connected in series with a +24V DC supply and a relay switch 51. When the thermostatic switch 50 is turned off, electric power supplied to the relay switch 51 is cut off, and the relay switch 51 operates to cut off power supplied to the exciting circuit 27, thereby to inhibit current from flowing through the exciting coil 18. The OFF operating temperature at which the thermostatic switch 50 is turned off is set to 200° C. The thermostatic switch 50 is located such that it faces the heat generation range H of the fixing belt (film) 10 without contacting with the outer surface of the fixing belt 10. The distance between the thermostatic switch 50 and the fixing belt 10 is controlled to about 2 mm. With this arrangement, the fixing belt 10 is prevented from being damaged due to contact with the thermostatic switch 50, thus assuring improved durability of the belt 10 and improved quality of the fixed image on the recording medium P.

In the present embodiment, where the fixing device goes runaway due to its failure, the fixing device is stopped while pinching or nipping a sheet of paper in the fixed nip portion N, and current is kept being supplied to the exciting coil 18 so that the fixing belt 10 continues to generate heat, the paper is not directly heated because heat is not generated at the fixing nip portion N in which the sheet of paper is gripped, unlike the arrangement of FIG. 3 in which heat is generated at the fixing nip portion N. With the thermostatic switch 50 provided at the heat generating region H that generates a large quantity of heat, the relay switch 51 operates to cut off electric power supplied to the exciting coil 18 at the point of time when the thermostatic switch 50 detects 220° C. and is turned off. In the present embodiment, the paper will not catch fire since it starts firing at about 400° C., and heat generation of the fixing belt 10 can be stopped.

A temperature fuse, instead of the thermostatic switch, may be used as a temperature detecting element. In the present embodiment, the toner contains a low softening substance, and therefore the fixing device is not provided with an oil coating mechanism for preventing offset. Where a toner that does not contain a low softening substance is used, however, the oil coating mechanism may be provided. Oil coating or cool separation may also be carried out even where the toner containing a low softening agent is used.

The exciting coil 18 and fixing belt 10 of the above-described fixing device 100 will be further described in greater detail.

(A) Exciting Coil 18

The exciting coil 18 is formed by winding plural times a bundle of thin copper wires as lead wires that constitute a coil, each of the wires being coated with an insulating material. In the present embodiment, the exciting coil 18 of ten turns is formed by winding the bundle of wires. Each wire is preferably coated with a heat-resistant insulating material, in view of conduction of heat generated by the fixing belt 10. For example, each wire is preferably coated with amide imide or polyimide. A pressure may be applied from the outside to the exciting coil 18, so as to improve its density or tightness.

The exciting coil 18 is shaped to extend along the curved surface of the heat generating layer as shown in FIG. 3. In the present embodiment, the distance between the heat generating layer of the fixing belt 10 and the exciting coil 18 is set to be about 2 mm. An exciting coil holding member 19 is formed of a material having an excellent insulating property and high heat resistance, which may be selected from phenol resin, fluororesin, polyimide resin, polyamide resin, polyamide imide resin, PEEK resin, PES resin, PPS resin, PFA resin, PTFE resin, FEP resin, and LCP resin.

The smaller the distance between the magnetic cores 17a, 17b, 17c and exciting coil 18 and the heat generating layer of the fixing belt 10, the higher the efficiency with which the magnetic flux is absorbed. This distance is preferably controlled to be equal to or smaller than 5 mm, since the efficiency is considerably lowered if the distance exceeds 5 mm. If the distance is within 5 mm, the distance between the heat generating layer of the fixing belt 10 and the exciting coil 18 need not be constant. Lead portions of the bundled wires 18a, 18b (FIG. 6) of the exciting coil 18 that are located outside the exciting coil holding member 19 are coated with an insulating material.

(B) Fixing Belt (Fixing Film) 10

Figure 9:
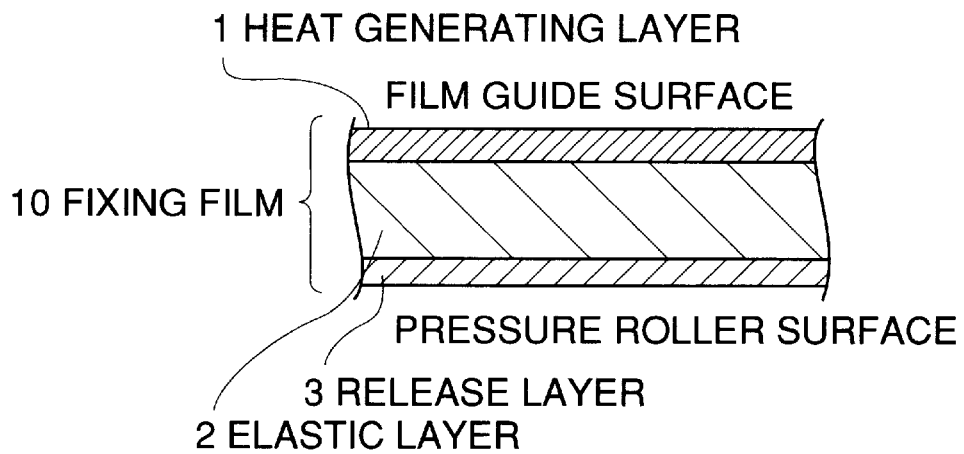
FIG. 9 is a view showing an example of a layered structure of the fixing belt (fixing film) of the fixing device.

FIG. 9 is a view useful in explaining the layered structure of the fixing belt (fixing film) 10 of the present embodiment. The fixing belt (fixing film) 10 of the present embodiment has a composite structure that is composed of a heat generating layer 1, an elastic layer 2 superposed on the outer surface of the heat generating layer 1, and a release layer 3 superposed on the outer surface of the elastic layer 2. The heat generating layer 1 is formed of a metallic belt, or the like, and provides a base layer of the fixing belt 10 having an ability to generate heat due to electromagnetic induction. A primer layer (not shown) may be provided between each pair of layers, for bonding the heat generating layer 1 with the elastic layer 2, and bonding the elastic layer 2 with the release layer 3. The fixing belt 10 is formed in a substantially cylindrical shape such that the heat generating layer 1 is located on the side of the inner surface of the belt 10, and the release layer 3 is located on the side of the outer surface. As described above, eddy current occurs in the heat generating layer 1 due to the effect of the alternating magnetic flux, causing the heat generating layer 1 to generate heat. The heat generated is conducted through the elastic layer 2 and release layer 3, to heat the fixing belt 10, thereby to heat the recording medium P that is passed through the fixing nip portion N to accomplish fixing of a toner image on the medium P.

(a) Heat Generating Layer 1

The heat generating layer 1 is favorably made of a ferromagnetic metal, such as nickel, iron, ferromagnetic SUS, or a nickel-cobalt alloy. While a non-magnetic metal may be used, the heat generating layer 1 is preferably made of a metal, such as nickel, iron, magnetic stainless steel, or cobalt-nickel alloy, which is likely to absorb magnetic flux. The thickness of the heat generating layer 1 is preferably controlled to be larger than the skin depth (depth of penetration) as represented by the following expression, but not larger than 200 μm. The skin depth σ [m] is represented as follows:

$$\sigma = 503 \times (\rho/f\mu)^{1/2}$$

where f [Hz] is the frequency of the exciting circuit 27, μ is the permeability, and ρ [Ωm] is the specific resistance.

Figure 10:
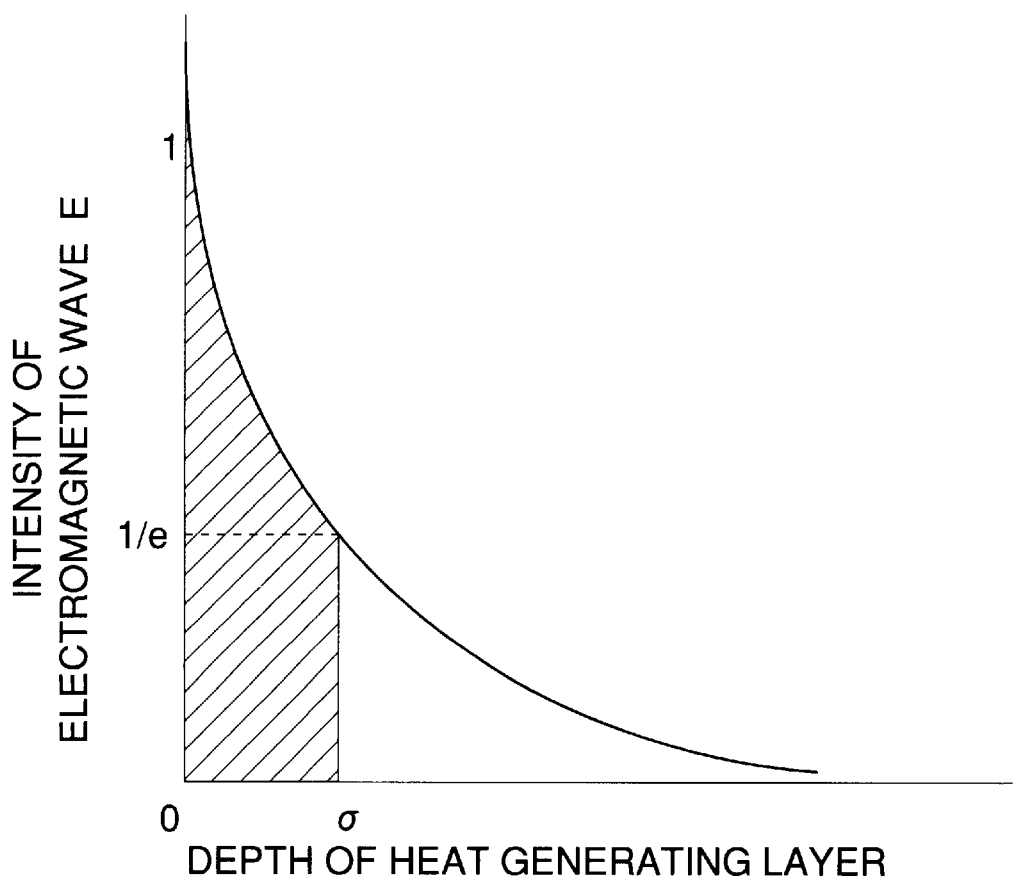
FIG. 10 is a graph showing the relationship between the intensity of electromagnetic wave and the depth of a heat generating layer.

The skin depth indicates the depth of absorption of an electromagnetic wave used for electromagnetic induction. The intensity of the electromagnetic wave is equal to or smaller than 1/e at a location that is deeper than this depth, as shown in the graph of FIG. 10, which means that most of the energy is absorbed in a portion down to the skin depth. FIG. 10 is a graph showing the relationship between the intensity of electromagnetic wave and the depth of the heat generating layer. The thickness of the heat generating layer 1 is preferably in the range of 1 to 100 μm. If the thickness of the layer 1 is smaller than 1 μm, most of electromagnetic energy cannot be absorbed, resulting in poor efficiency. If the thickness of the heat generating layer 1 exceeds 100 μm, the rigidity becomes too high, and its flexuosity deteriorates, thus making it impractical to use the resulting belt 10 as a rotator. Accordingly, the thickness of the heat generating layer 1 is preferably in the range of 1 to 100 μm.

(b) Elastic Layer 2

The elastic layer 2 is formed of a material, such as silicone rubber, fluorine-contained rubber, or fluorosilicone rubber, which has high heat resistance and high thermal conductivity. The thickness of the elastic layer 2 is preferably in the range of 10 to 500 μm. The elastic layer 2 is required to have this range of thickness so as to assure sufficient quality of fixed images. Where a color image is to be printed, in particular, where a photographic image is to be printed, a solid image is formed over a relatively large area on the recording medium P. In this case, the degree of heating is varied from portion to portion if the heating surface (release layer 3) cannot follow minute protrusions and recesses of the recording medium or those of the toner layer, and gloss variations appear in the image depending upon the quantity of heat transferred to each portion of the recording medium. Namely, some portions to which a large quantity of heat has been transferred has relatively high glossiness, and other portions to which a small quantity of heat has been transferred has relatively low glossiness.

If the thickness of the elastic layer 2 is equal to or smaller than 10 μm, the heating surface cannot completely follow protrusions and recesses of the recording medium or toner layer, thus causing gloss variations to appear in the resulting image. If the thickness of the elastic layer 2 is 100 μm or larger, the heat resistance of the elastic layer 2 is increased, thus making it difficult to achieve quick start. More preferably, the thickness of the elastic layer 2 is in the range of 50 to 500 μm.

If the elastic layer has a high degree of hardness, the heating surface of the fixing belt 10 does not follow protrusions and recesses of the recording medium or toner layer, thus causing gloss variations to appear in the resulting image. It is therefore preferable to control the hardness of the elastic layer 2 to be equal to or smaller than 60 degrees (JIS-A), more preferably, equal to or smaller than 45 degrees (JIS-A).

The thermal conductivity λ of the elastic layer 2 is preferably in the range of $6 \times 10^{-4}$ to $2 \times 10^{-3}$ [cal/cm·sec·deg.]. If the thermal conductivity λ is smaller than $6 \times 10^{-4}$ [cal/cm·sec·deg.], the thermal resistance is too large, and a temperature rise at the surface layer (release layer 3) of the fixing belt 10 is delayed. If the thermal conductivity λ is larger than $2 \times 10^{-3}$ [cal/cm·sec·deg.], on the other hand, the hardness may be excessively high, or the compression set may deteriorate. Accordingly, the thermal conductivity λ is preferably in the range of $6 \times 10^{-4}$ to $2 \times 10^{-3}$ [cal/cm·sec·deg.], and more preferably, in the range of $8 \times 10^{-4}$ to $1.5 \times 10^{-3}$ [cal/cm sec -deg.].

(c) Release Layer 3

The release layer 3 is formed of a material having a good mold release property and high heat resistance, which may be selected from fluororesin, silicone resin, fluorosilicone rubber, fluorine-contained rubber, silicone rubber, PFA, PTFE, FEP, and other materials. The thickness of the release layer 3 is preferably in the range of 1 to 100 μm. If the thickness of the release layer 3 is smaller than 1 μm, some portions may have a poor mold release property due to uneven coating of the coating film, or the resulting film may have insufficient durability. If the thickness of the release layer 3 exceeds 100 μm, thermal conduction may deteriorate, and the hardness becomes excessively high particularly when the release layer is made of a resin, thus eliminating the effect of the elastic layer 2.

Figure 11:
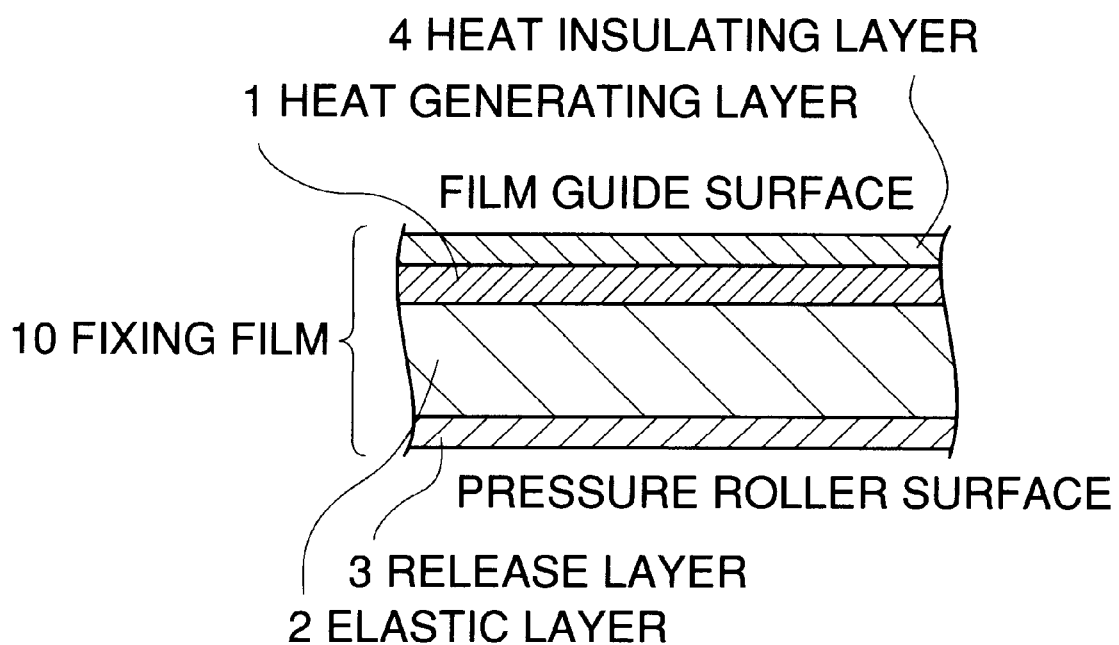
FIG. 11 is a view showing another example of a layered structure of the fixing belt (fixing film) of the fixing device.

As shown in FIG. 11, the fixing belt (fixing film) 10 may be constructed such that a heat insulating layer 4 is provided on the side of the belt guide surface of the heat generating layer 1. The heat insulating layer 4 is made of a heat insulating material, which may be selected from fluorine-contained resin, polyimide resin, polyamide resin, polyamide imide resin, PEEK resin, PES resin, PPS resin, PFA resin, PTFE resin, FEP resin, and others.

The thickness of the heat insulating layer 4 is preferably in the range of 10 to 1000 μm. If the thickness of the heat insulating layer 4 is smaller than 10 μm, the layer 4 cannot provide a sufficient heat insulating effect, and also suffers from insufficient durability. If the thickness of the heat insulating layer 4 is greater than 100 μm, the distance from the magnetic cores 17a, 17b, 17c and exciting coil 18 to the heat generating layer 1 is increased, with a result that the magnetic flux cannot be sufficiently absorbed by the heat generating layer 1. The heat insulating layer 4 is able to block heat so that heat generated in the heat generating layer 1 is not transferred to the inside of the fixing belt 10, thus assuring an improved efficiency with which the heat is supplied to the recording medium P, as compared with the case where no heat insulating layer is provided. Consequently, power consumption can be reduced.

Figure 12:
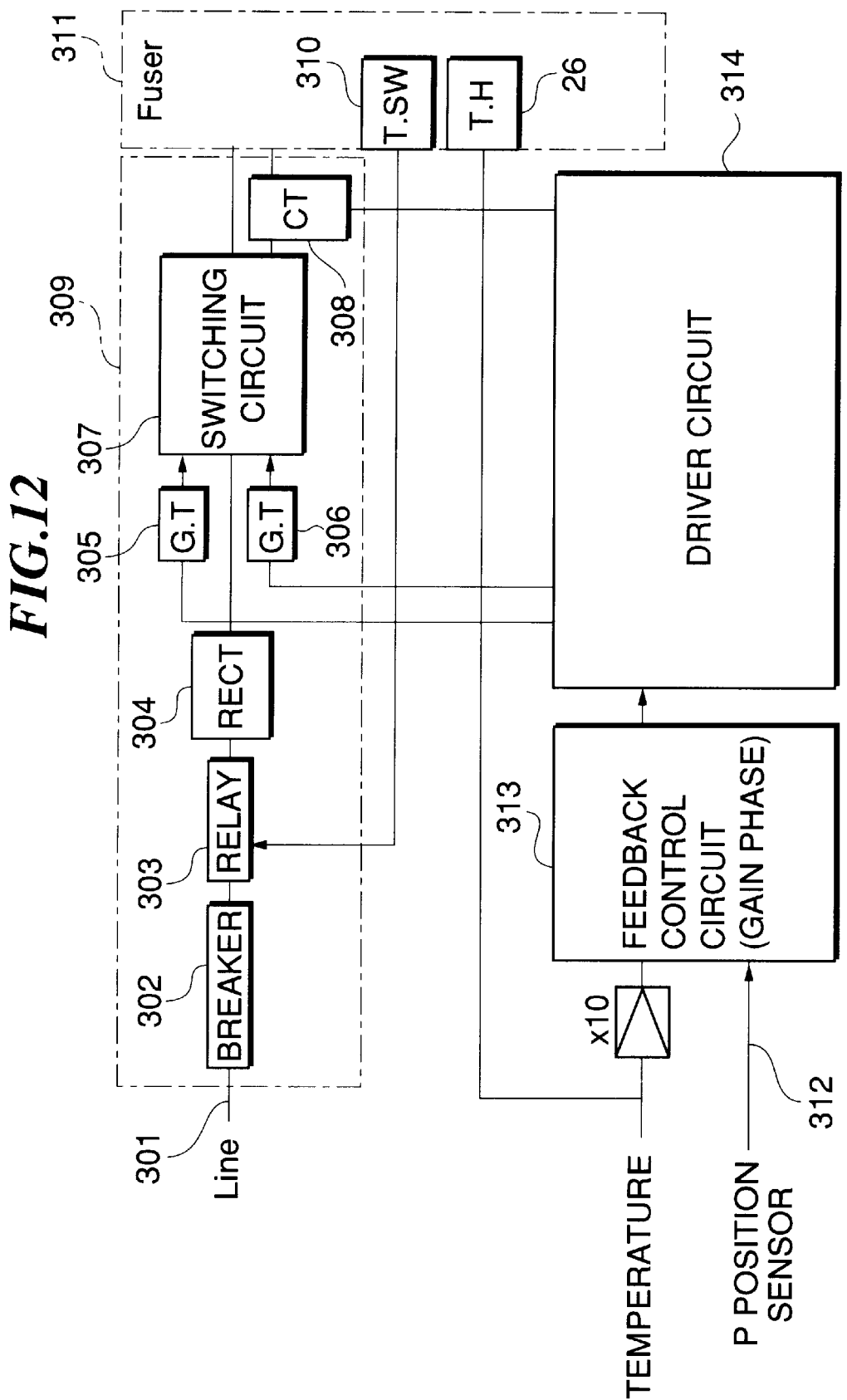
FIG. 12 is a block diagram showing the whole arrangement of an induction heating control system including a voltage resonance type converter.

FIG. 12 is a block diagram showing the whole configuration of an induction heating control system including an output converter that will be described later referring to FIG. 1, which control system is incorporated in the image forming apparatus according to the first embodiment constructed as described above. The induction heating control system of the image forming apparatus includes a voltage control circuit 309, a fixing unit (fuser) 311, a feedback control circuit 313, and a driver circuit 314. The voltage control circuit 309 includes an overcurrent breaker 302, relay 303, rectifier circuit (RECT) 304, gate control transformers 305, 306, voltage resonance switching circuit 307, and a current transformer 308. In FIG. 12, reference numeral 301 denotes a power supply line input terminal, and 312 denotes a heating ON/OFF signal of the fixing device.

The construction and operation of the above control system will be described in greater detail. The overcurrent breaker 302 protects the circuit from overcurrent or excessive current. The rectifier circuit 304 is composed of a bridge rectifier circuit that performs full-wave rectification on an alternating input, and a capacitor that performs high-frequency filtering. The voltage resonance switching circuit 307 performs current switching. The current transformer 308, which serves to detect switching current that is switched by the voltage resonance switching circuit 307, is connected to the exciting coil 18 of the fixing device.

The fixing unit (fuser) 311 has electric components including the exciting coil 18 (not shown in FIG. 12) as described above, temperature detection thermistor (temperature sensor) 26, and a thermostatic switch 310 for detecting an excessively elevated temperature. A heating ON/OFF signal 312 of the fixing device is fed from a sequence controller (not shown) of the image forming apparatus (printer). The feedback control circuit 313 controls the driver circuit 314 based on a temperature detected by the thermistor of the fixing device, while comparing the detected value with a target temperature. The driver circuit 314 receives a feedback control signal from the feedback control circuit 313, so as to perform control operations suitable for the control mode of the present converter.

When an alternating voltage is applied from the input terminal 301 of the power supply line to the rectifier circuit 304, through the overcurrent breaker 302 and relay 303, the rectifier circuit 304 produces a pulsating dc voltage by use of a full-wave rectifying diode. Thereafter, the gate control transformers 305, 306 are driven so as to perform alternate switching of switching devices in the voltage switching circuit 307, so that a high-frequency voltage is applied to the exciting coil 18. By controlling current flowing through the exciting coil 18, eddy current that flows through the fixing belt (fixing film) 10 is varied, and electric power for generating heat is thus controlled.

More specifically described with reference to FIG. 12, alternating voltage received from the power supply input terminal 301 is applied to the rectifier circuit 304 through the overcurrent breaker 302 for protecting the circuit from overcurrent and contacts of the relay 303. Here, the exciting winding of the relay 303 is adapted to be energized via contacts of the thermostatic switch 310 that opens when the detected belt (film) temperature is abnormally raised to such a high level that exceeds a predetermined temperature. If a trouble occurs, and the temperature of the present fixing device is raised to an excessively high level, the relay 303 is de-energized, to cut off the power supply of the exciting circuit, thus assuring safety of the fixing device against thermal runaway. In the rectifier circuit 304, a rectifying bridge circuit (not shown) that receives the alternating voltage produces a commutated wave with ripples, which is in turn supplied to the voltage resonance switching circuit 307 via an LC filter. The operation of the voltage resonance switching circuit 307 will be explained referring to FIG. 1 below.

The current transformer (current detection transformer) 308 and gate control transformers 305, 306 are constructed so as to ensure double insulation between a live voltage circuit and a secondary voltage circuit through the insulating operations of the transformers. The fixing temperature is detected by the temperature sensor (thermistor) 26, and a control signal is produced to which optimum control factors are given depending upon the condition of paper passing through the fixing device, the quality of paper and the fixing temperature. The control signal is applied with the ON duration corresponding to the voltage resonance control of the power supply of the present invention, to enable the driver circuit 314 to perform gate control of semiconductor switching devices.

The voltage resonance converter is adapted to control the switching ON duration so as to eliminate a difference between the current fixing temperature and the target fixing temperature. The construction and operation of the voltage resonance converter will be described in detail referring to FIG. 1 and FIG. 13.

Figure 1:
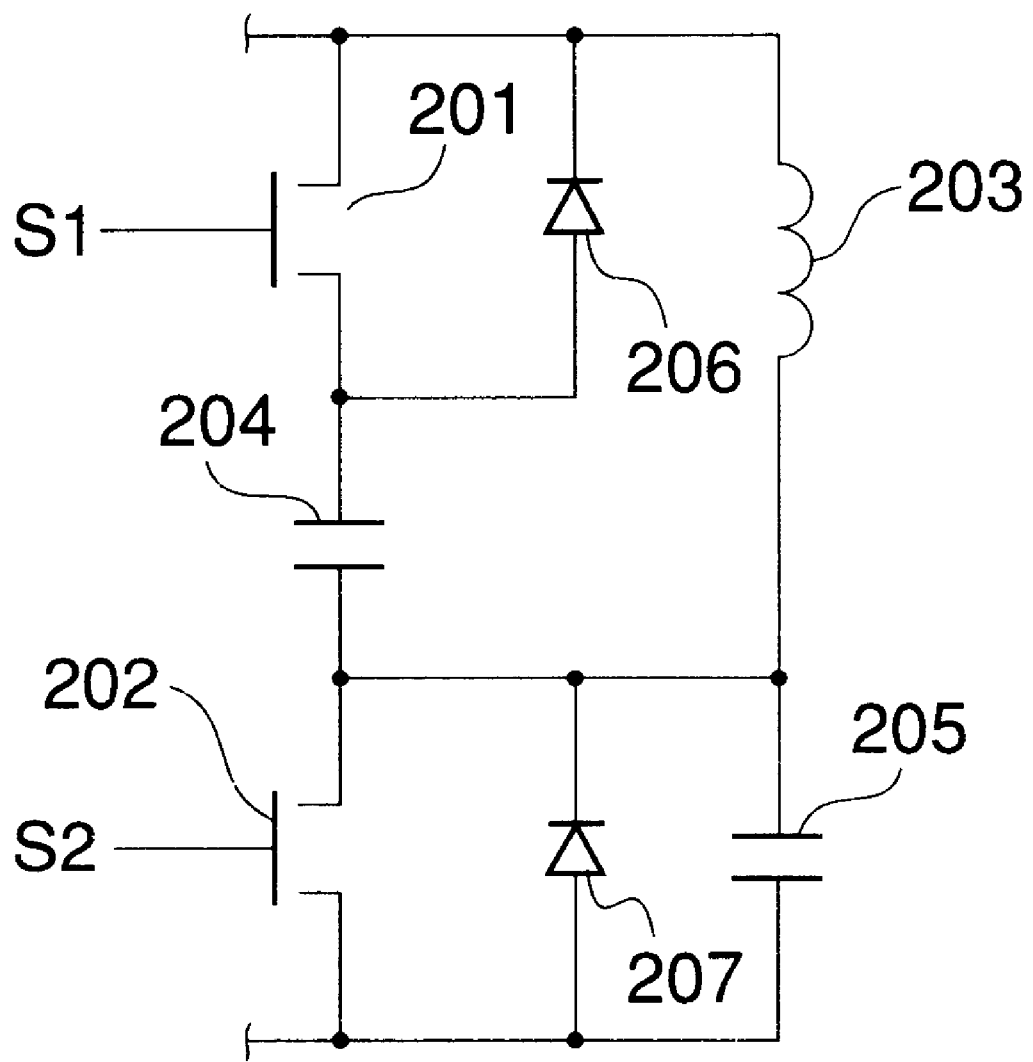
FIG. 1 is a circuit diagram showing the configuration of a voltage resonance type converter in an image forming apparatus according to a first embodiment of the present invention.

FIG. 1 is a circuit diagram showing the configuration of the voltage resonance converter according to the first embodiment of the present invention, which diagram is useful in explaining the operating method for realizing the above-described control circuit. The voltage resonance converter according to the first embodiment is comprised of a switching device 201 (first switching device), a main switching device 202 (second switching device), an exciting coil 203 (magnetic field generating device), first resonating capacitor 204 (first charging device), second resonating capacitor 205 (second charging device), a regenerative (by pass) diode 206 (first rectifying device), and a regenerative (by pass) diode 207 (second rectifying device).

There will be described the manner in which respective components as indicated above are connected to each other. The first resonating capacitor 204 is connected in series with the switching device 201 that is connected to the power supply, and the main switching device 202 is connected in series with the first resonating capacitor 204. Also, the exciting coil 203 for magnetic induction heating is connected between the power supply and a node between the first resonating capacitor 204 and the main switching device 202, and the second resonating capacitor 205 is connected in parallel with the main switching device 202. The switching device 201 and the main switching device 202 are connected in parallel with the regenerative diodes (rectifying devices) 206, 207, respectively.

Figure 13:
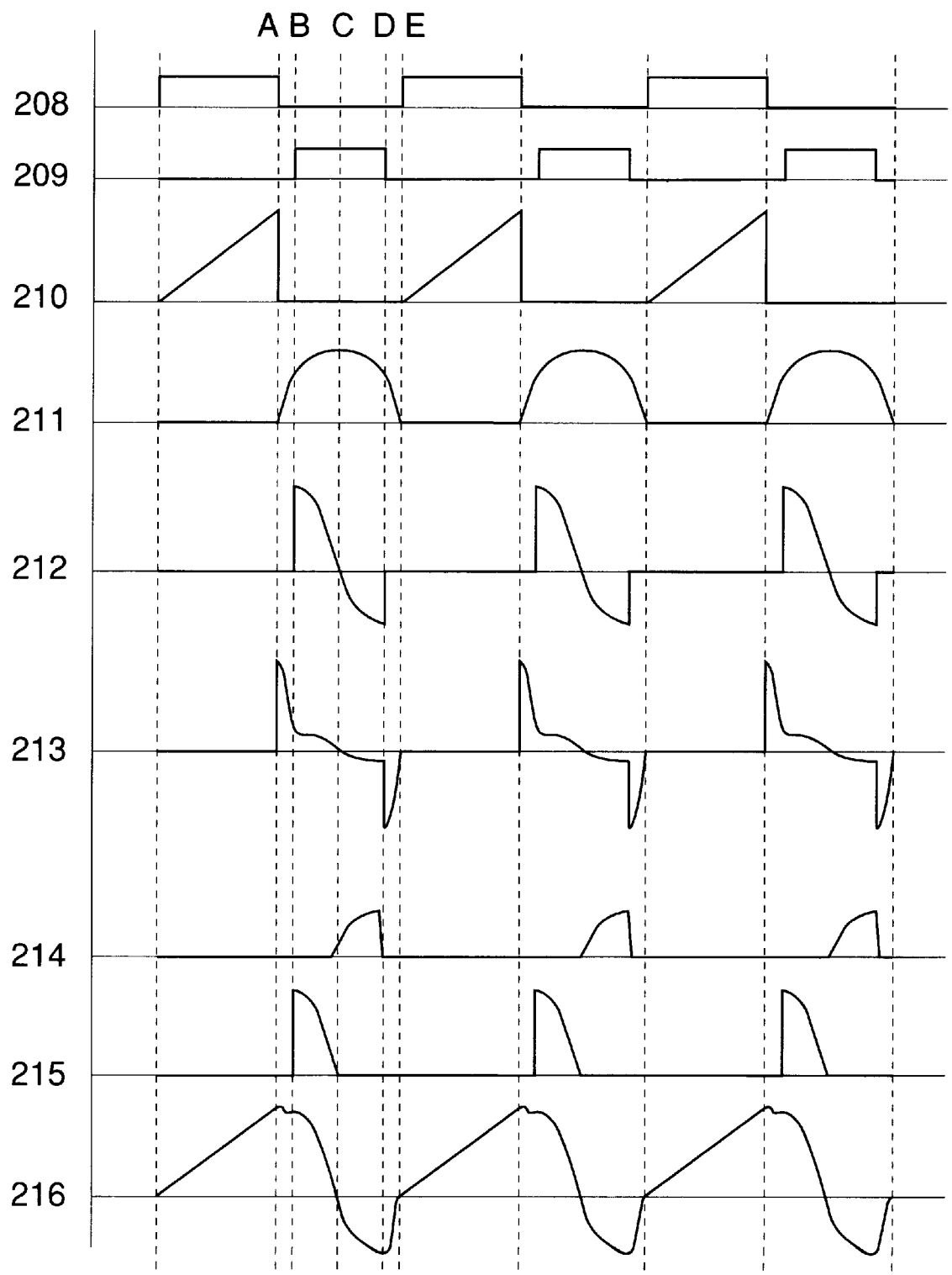
FIG. 13 is a view showing operating waveforms that appear in the voltage resonance type converter according to the first embodiment.

FIG. 13 is a view useful in explaining the operating waveforms in the circuit arrangement of FIG. 1. In FIG. 13, 208 indicates the gate voltage waveform of the main switching device 202, 209 indicates the gate voltage waveform of the switching device 201, 210 indicates the current waveform of the main switching device 202, 211 indicates the voltage waveform of the main switching device 202, 212 indicates the current waveform of the first resonating capacitor 204, 213 indicates the current waveform of the second resonating capacitor 205, 214 indicates the current waveform of the switching device 201, 215 indicates the current waveform of the regenerative diode 206, and 216 indicates the exciting current waveform of the exciting coil 203.

Next, the operation of the present circuit will be described in detail. When the main switching device 202 is turned on, induction current as represented by the waveform 210 flows from the power supply through the exciting coil 203. Upon turn-off (at point A) of the main switching device 202, the exciting coil 203 produces flyback voltage as represented by the waveform 211, in such a direction as to maintain the current.

In the operation of the first embodiment of the present invention, a difference in residual electric charges arises between the first resonating capacitor 204 and the second resonating capacitor 205 (due to an influence of residual charge of the first resonating capacitor 204 as described later), and therefore an arc defined by the resonance period $\omega=\sqrt{(L \times C)}$ that is determined by the second resonating capacitor 205 and the exciting coil 203 is drawn in a short period immediately after the turn-off of the main switching device 202. The capacity of the second resonating capacitor 205 is set to be approximately one-tenth of that of the first resonating capacitor 204. Accordingly, the flyback voltage is produced in a short period between A and B immediately after the turn-off.

The oscillation of the flyback voltage causes the regenerative diode 206 to be turned on at the point of time (point B) when the voltage increases up to the initial charge voltage of the first resonating capacitor 20, and is replaced by a gentle sine wave due to the resultant capacity of the first resonating capacitor 204 and the second resonating capacitor 205, with an increase in the voltage. 212 indicates the current waveform of the first resonating capacitor 204 during this period, and 215 indicates the current waveform of the regenerative diode 206, while 213 indicates the current waveform of the second resonating capacitor 205.

The voltage of the main switching device 202 increases with time, and reaches the maximum point (point C) at the moment when $\omega/4$ elapses. On the other hand, the current waveform 212 assumes a cosine wave equivalent to as a differential of the voltage waveform, and therefore the current reaches its minimum value (or crosses zero) at the maximum point (point C) of the voltage. After the current waveform crosses zero, the regenerative diode 206 is turned off, and therefore the gate of the switching device 201 is turned on so as to regenerate current (in the period of C to D). 214 indicates the current waveform of the switching device 201 during this period. The first resonating capacitor 204 becomes inoperative at the point of time (point D) when the switching device 201 is turned off, and the second resonating capacitor 205 having a small capacity and the coil 203 resonate, thus drawing an arc in a short period (the period of D to E). This behavior is the most significant operation of the first embodiment of the present invention, and the period of D to E will be further described in greater detail.

At the point D, the entire discharge current flowing through the first resonating capacitor 204 flows into the second resonating capacitor 205. This operating state will be explained in terms of a change in the damping factor= $\sqrt{(L/C)}$ that contributes to the oscillation of the circuit. As a result of reduction in the capacitance C, the damping factor increases in proportion to the amount of reduction of C, and strong oscillation of a short period can be obtained. The strong oscillation voltage is the most important element in voltage resonance, which gives rise to point E of the voltage waveform 211 at which the flyback voltage waveform due to voltage oscillation crosses zero.

Since the current and voltage are both at low levels at this point E, the switching loss can be reduced to a minimum when the switching device is turned on/off. Also, the switching device 201 that performs switching of regenerative current is turned on/off at point D at which the voltage is relatively low in the vicinity of the power supply voltage, and the current value is low due to damping by the exciting load. Thus, the switching device 201 and main switching device 202 can perform switching operations with considerably low loss. With the present arrangement, the switching device 201 connected to the first resonating capacitor 204 can be started from the OFF state even upon the start of the inverter, thus making it possible to significantly reduce a transient burden that occurs upon start of the resonance power supply.

Figure 14:
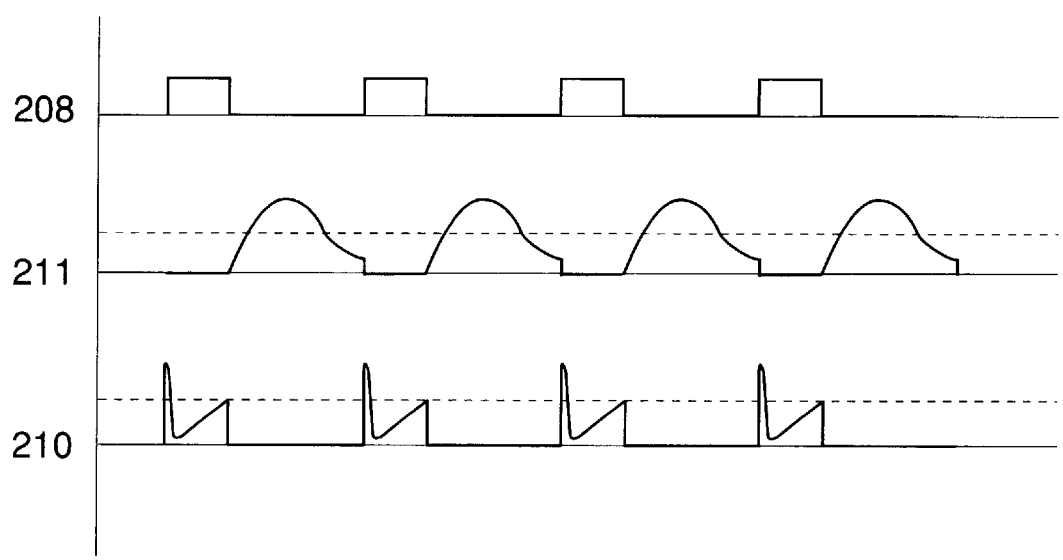
FIG. 14 is a view showing operating waveforms that appear in a conventional voltage resonance type converter for comparison with the first embodiment.
Figure 15:
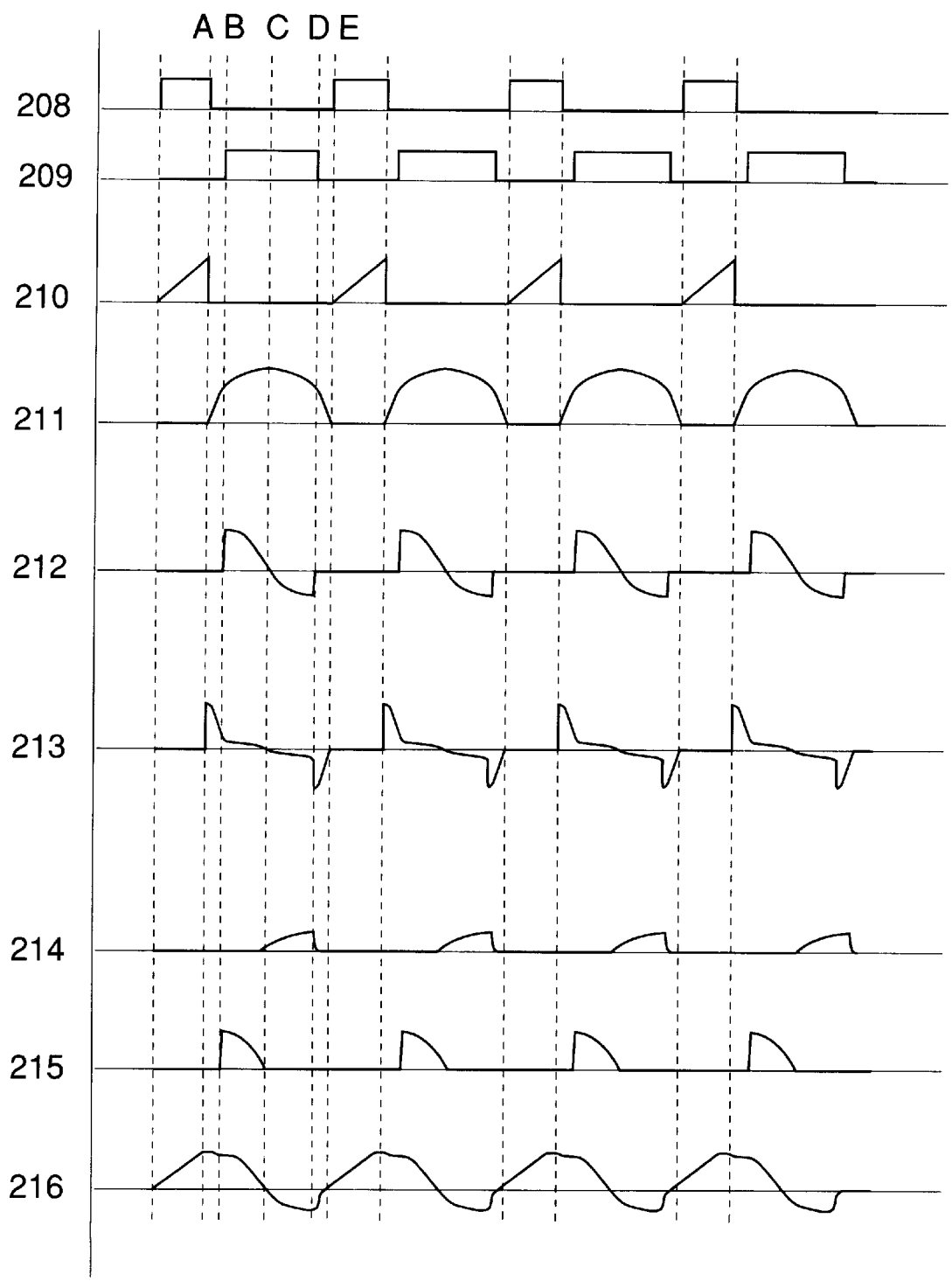
FIG. 15 is a view showing operating waveforms that appear when the power is restricted in the voltage resonance type converter of the first embodiment.
Figure 25:
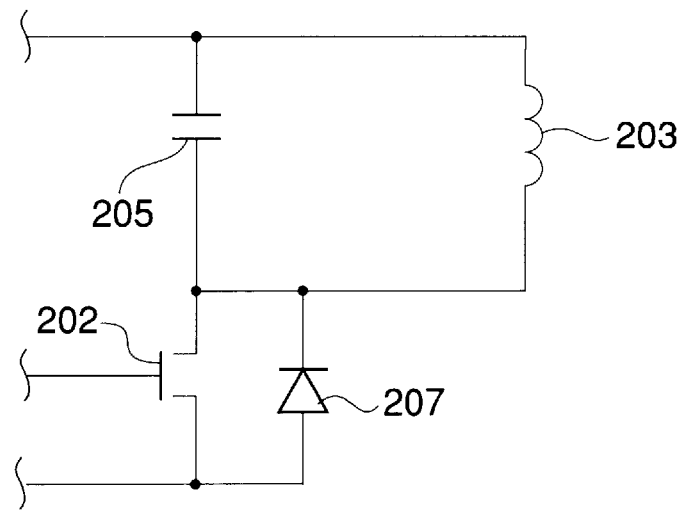
FIG. 25 is a circuit diagram showing a known example of voltage resonance type inverter circuit.
Figure 26:
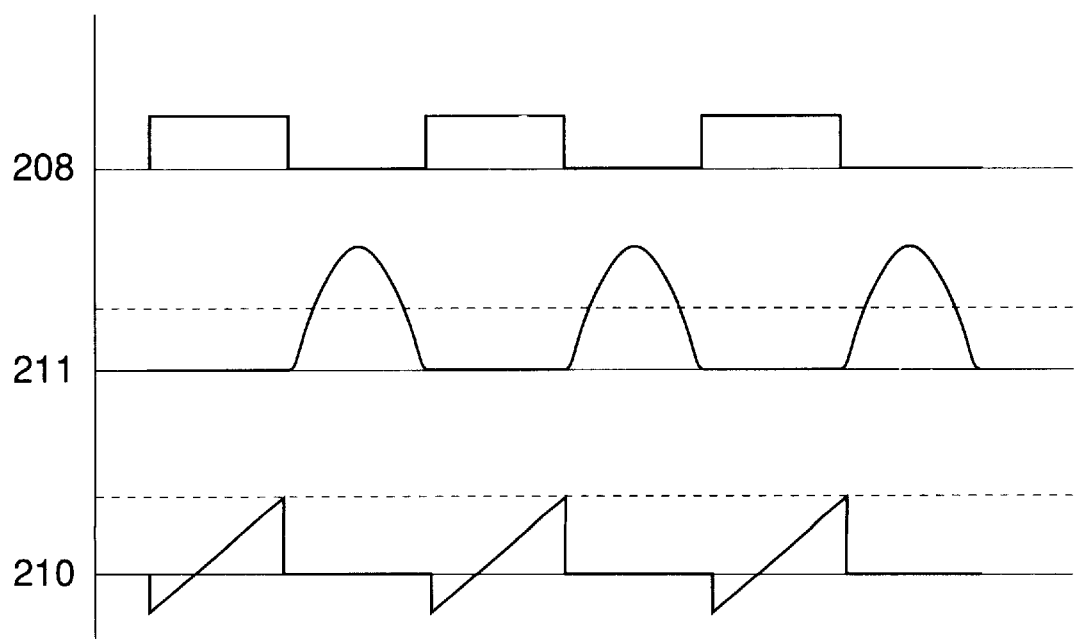
FIG. 26 is a view showing waveforms that appear during resonance.
Figure 27:
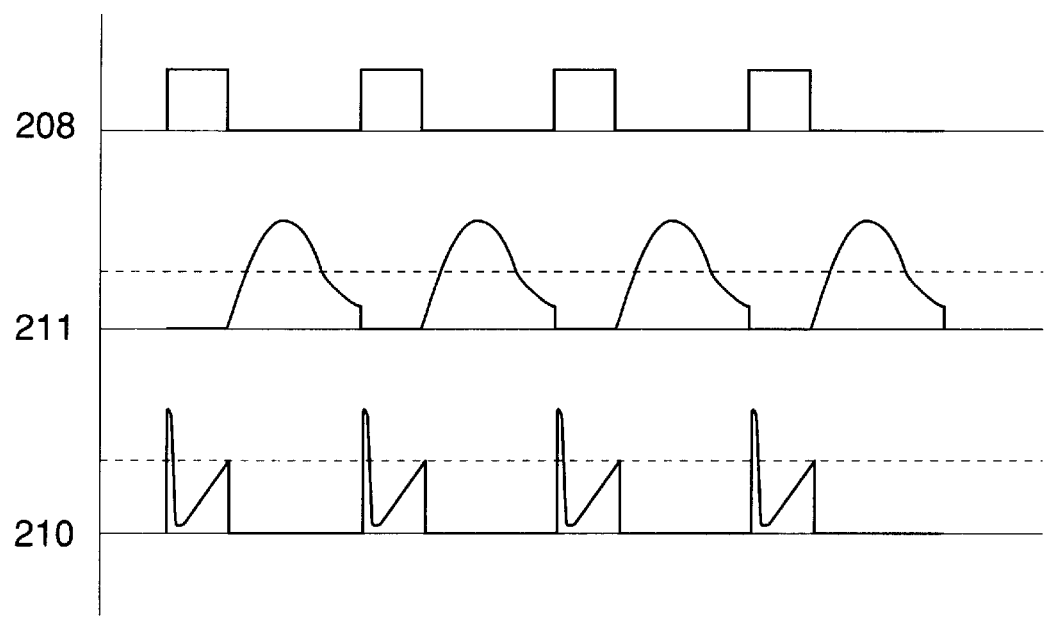
FIG. 27 is a view showing waveforms that appear during resonance when the ON duration of a gate switching signal is reduced in the known example.

FIG. 14 shows the operating waveforms of the conventional voltage resonance converter (FIG. 25). FIG. 15 shows the waveform of each part of the synchronized charging type voltage resonance converter according to the first embodiment of the present invention, when electric power is restricted to a certain range.

In the conventional voltage resonance converter, resonance starts with the constant determined by the resonating capacitor and the exciting coil, immediately after the switching device is turned off by controlling the gate voltage. As is understood from the circuit arrangement of FIG. 25, the voltage oscillation is an oscillating waveform response that oscillates about the power supply voltage Vcc (broken line in FIG. 14).

Since the output is restricted, the maximum current of the chopping wave in the current waveform is small, as indicated by waveform 210, and therefore the electric power stored in the resonance circuit is reduced. As a result, the voltage oscillation cannot achieve a sufficient reduction from the power supply voltage Vcc, and a voltage (Vf) remains in the waveform 211. The power supply impedance of the remaining voltage is considerably reduced by the resonating capacitor. If the switching device is turned on in this state, therefore, excessive current flows through the switching device, and the device may be damaged. This operating state is shown in the current waveform 210 of the switching device of FIG. 14.

It will be understood from the waveform of each portion of the synchronized charging type voltage resonance converter according to the first embodiment of the present invention as shown in FIG. 15 that even where electric power is reduced, the voltage crosses zero with a sufficiently large amplitude of voltage oscillation, owing to a high damping action due to a switching operation of the second resonating capacitor 205 of a small capacity in the period of point D to E. Upon turn-on (at point E) of the main switching device 202, therefore, the minimum conditions of both of voltage and current are established, and excessive current does not occur upon switching, thus realizing low-loss switching.

As described above, the voltage resonance converter according to the first embodiment of the present invention has the switching device 201 connected to the power supply, first resonating capacitor 204 connected in series with the switching device 201, main switching device 202 connected in series with the first resonating capacitor 204, exciting coil 203 connected between the power supply and a node between the first resonating capacitor 204 and the main switching device 202, second resonating capacitor 205 connected in parallel with the main switching device 202, and the regenerative diodes 206, 207 connected in parallel with the switching device 201 and the main switching device 202, respectively. With this arrangement, the voltage resonance converter provides the effects or advantages as described below.

To realize so-called "on demand fixation" by heating the fixing belt (metallic film) utilizing magnetic induction, the voltage resonance power supply is employed as a high-frequency power supply, and the switching device is connected in series with the voltage resonance capacitor. In operation, the switching device and the main switching device are alternately turned on/off, thereby to overcome the problem of a narrow output control width that had been a drawback of the conventional voltage resonance power supply, thus making it possible to minimize the switching loss during control operations.

The voltage resonance type power supply used in the magnetic induction heating type fixing device adapted for heating the fixing belt (metallic film) through magnetic induction is advantageous in that it can provide a soft switching configuration that permits the output power to vary from the maximum output value to zero, without imposing a great burden upon the semiconductor devices mounted in the power supply. Also, the increase in the control width of fixing power leads to an improved accuracy in temperature control and an increased margin of the input voltage range, thus providing a power supply arrangement having a relatively wide tolerance or freedom in selecting devices, as compared with the conventional voltage resonance capacitor that requires highly strict control of the resonance period. Each of the above advantages will be summarized below.

(1) The thermal time constant of the fixing device is naturally controlled to be small so as to realize on demand fixation. Thus, the fixing device has a quick thermal response, and therefore the linearity of electric power control and the control response turn out to be considerably important factors. According to the present invention, the output control width can be continuously varied from substantially zero to the maximum output, and this effect can be appreciated when conventional PID (Proportional plus Integral plus Derivative) control, or the like, is used for feedback control.

(2) The voltage resonance converter operates in the manner as described above, in which it employs a combination of two resonance states (low-frequency resonance and high-frequency resonance). Thus, the resulting voltage waveform is an intermediate between a sine wave and a rectangular wave, and therefore the maximum-value waveform factor relative to the effective voltage value can be reduced as compared with that of a conventional voltage resonance waveform (sine half wave), and thus the switching device is only required to withstand a relatively low voltage.

(3) In the present resonance method, the electrostatic capacity of the low-frequency resonating capacitor may be determined to at least such a value that the resonance period with which the capacitor resonates with the exciting coil corresponds to the turn-off duration of the switching device. Further, the high-frequency resonating capacitor realizes a high damping state at a high frequency during its operations, thus permitting an increased degree of freedom in the on/off timing of the switching device. Thus, the above-described circuit is able to flexibly deal with variations in the characteristics of the individual components, and thus can be manufactured and used in practice with high efficiency.

(4) Since the resonance method is employed, the switching loss and/or switching noise can be reduced notwithstanding the large electric power to be handled.

<Second Embodiment>

Figure 16:
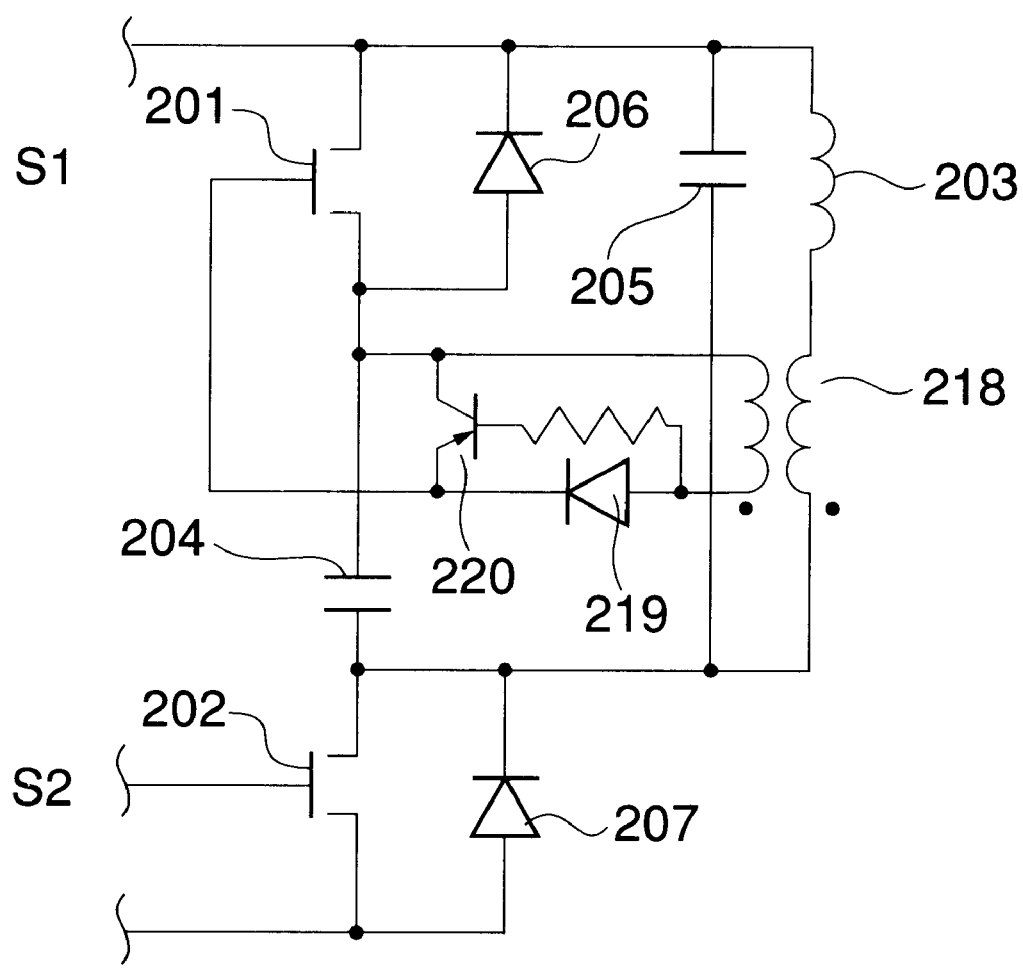
FIG. 16 is a circuit diagram showing the configuration of a voltage resonance type converter according to a second embodiment of the present invention.

FIG. 16 is a circuit diagram showing the configuration of a voltage resonance type converter according to a second embodiment of the present invention. The voltage resonance type converter of the second embodiment is comprised of a switching device 201 (first switching device), main switching device 202 (second switching device), exciting coil 203 (magnetic field generating device), first resonating capacitor 204 (first charging device), second resonating capacitor 205 (second charging device), regenerative diode 206 (first rectifying device), regenerative diode 207 (second rectifying device), gate transformer 218, diode 219, and a transistor 220.

The above-indicated components are connected to each other in the manner as follows: the first resonating capacitor 204 is connected in series with the switching device 201 that is connected to a power supply, and the main switching device 202 is connected in series with the first resonating capacitor 204. The exciting coil 203 and gate transformer 218 are connected between the power supply and a node between the first resonating capacitor 204 and the main switching device 202. The second resonating capacitor 205 is connected in parallel with the exciting coil 203. The regenerative diodes 206, 207 are connected in parallel with the switching device 201 and the main switching device 202, respectively. Also, the diode 219 and transistor 220 are connected to the gate transformer 218.

The construction of the image forming apparatus according to the second embodiment of the present invention, the construction of the fixing device of the image forming apparatus, and the whole configuration of the induction heating control system of the image forming apparatus including the voltage resonance converter are identical with those of the first embodiment described above in detail, and therefore description thereof is omitted.

The second resonating capacitor 205 of FIG. 16 need not be connected to the opposite ends of the main switching device 202 as in FIG. 1 showing the first embodiment, but may be provided at the opposite ends of the exciting coil 203. In this case, too, the capacitor 205 operates in substantially the same manner. As is understood from the operations described above with respect to the first embodiment, the switching device 201 is turned on to allow current to flow therethrough when the coil current is in a negative region. Thus, similar effects can be obtained by monitoring the coil current, and turning on the switching device 201 when the polarity of the coil current becomes negative.

Figure 17:
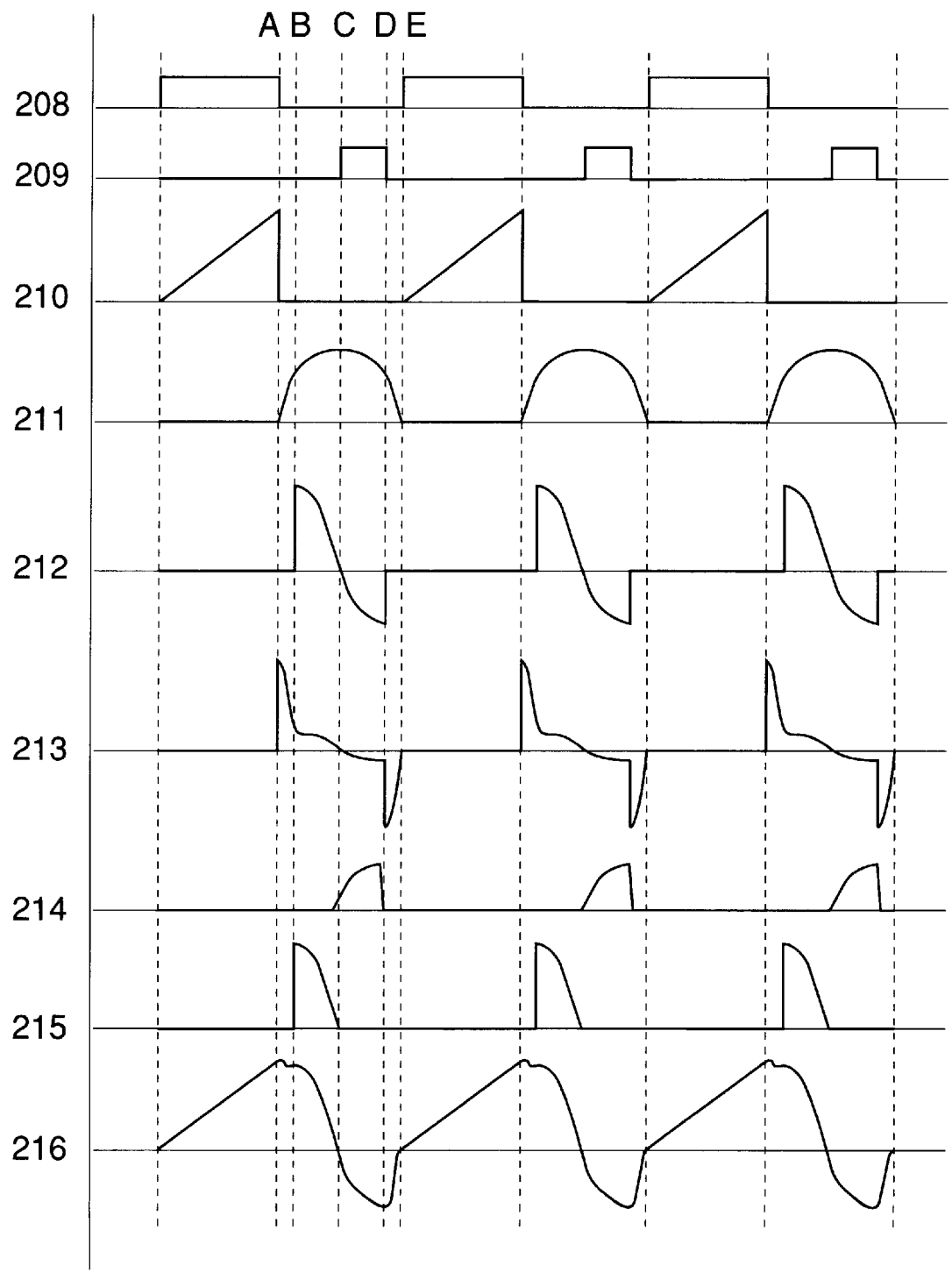
FIG. 17 is a view showing operating waveforms that appear in the voltage resonance type converter of the second embodiment.

More specifically, a current detecting coil of the exciting coil 203 provides a waveform of the current flowing through the exciting coil 203, and the rectifying diode 219 provides a gate signal for turning on the switching device 201, at point C where the exciting current as indicated at 216 in FIG. 17 crosses zero. As a result, current regeneration of the first resonating capacitor 204 is carried out by the switching device 20, and the gate transformer 218 is reversed (at point D) when the coil current reaches its negative maximum point, to turn off the switching device 201. Thereafter, the voltage is rapidly reduced, and the main switching device 202 is turned on at point E.

As explained above, the voltage resonance converter of the image forming apparatus according to the second embodiment of the present invention has the switching device 201 connected to the power supply, first resonating capacitor 204 connected in series with the switching device 201, main switching device 202 connected in series with the first resonating capacitor 204, exciting coil 203 connected between the power supply and a node between the first resonating capacitor 204 and the main switching device 202, second resonating capacitor 205 connected in parallel with the exciting coil 203, and regenerative diodes 206, 207 connected in parallel with the switching device 201 and main switching device 202, respectively. With this arrangement, the voltage resonance converter yields the following effects as provided in the first embodiment as described above.

(1) The thermal time constant of the fixing device is naturally controlled to be small so as to realize on demand fixation. Thus, the fixing device has a quick thermal response, and therefore the linearity of electric power control and the control response turn out to be considerably important factors. According to the present invention, the output control width can be continuously varied from substantially zero to the maximum output, and this effect can be appreciated when conventional PID (Proportional plus Integral plus Derivative) control, or the like, is used for feedback control.

(2) The voltage resonance converter operates in the manner as described above, in which it employs a combination of two resonance states (low-frequency resonance and high-frequency resonance). Thus, the resulting voltage waveform is an intermediate between a sine wave and a rectangular wave, and therefore the maximum-value waveform factor relative to the effective voltage value can be reduced as compared with that of a conventional voltage resonance waveform (sine half wave), and the switching device is only required to withstand a relatively low voltage.

(3) In the present resonance method, the electrostatic capacity of the low-frequency resonating capacitor may be determined to at least such a value that the resonance period with which the capacitor resonates with the exciting coil corresponds to the turn-off duration of the switching device. Further, the high-frequency resonating capacitor realizes a high damping state at a high frequency during its operations, thus permitting an increased degree of freedom in the on/off timing of the switching device. Thus, the above-described circuit is able to flexibly deal with variations in the characteristics of the individual components, and thus can be manufactured and used in practice with high efficiency.

(4) Since the resonance method is employed, the switching loss and/or switching noise can be reduced notwithstanding the large electric power to be handled.

The present invention may be applied to a system composed of a plurality of apparatuses, or only to a single apparatus. While the power supply device (voltage resonance converter) of the present invention is installed in an electrophotographic color printer as one type of image forming apparatus in the first and second embodiments, the present invention may also be applied to other types of image forming apparatus in which a fixing device using the power supply device (voltage resonance converter) of the invention may be installed.

<Third Embodiment>

Figure 18:
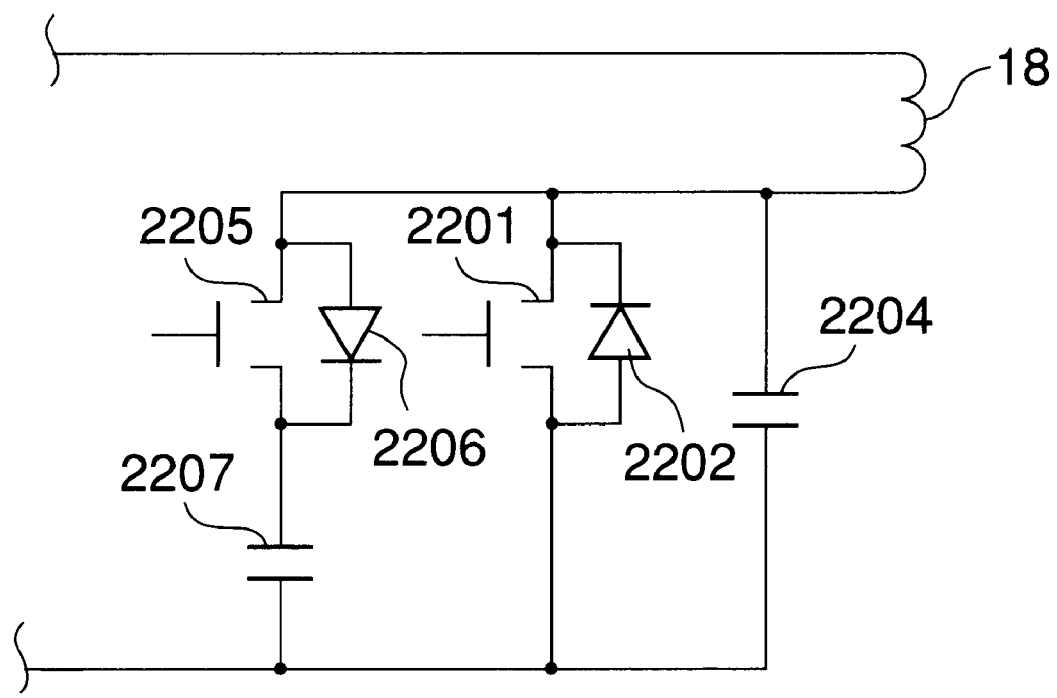
FIG. 18 is a circuit diagram showing the basic configuration of a switching portion in an induction heating control system according to a third embodiment of the present invention.

FIG. 18 is a circuit diagram showing the configuration of a voltage resonance type converter according to a third embodiment of the present invention.

In the voltage resonance type converter of FIG. 18, a switching device 2201, a regenerative diode 2202, and a resonating capacitor 2204 that are connected in parallel with each other, a switching device 2205 and a resonating capacitor 2207 that are connected in series with each other, and a regenerative diode 2206 connected in parallel with the switching device 2205 are connected to an exciting coil 2018.

The sub switching device 2205 and sub resonating capacitor 2207 connected in series with each other are connected in parallel with the main switching device 2201, regenerative diode 2202, and the main resonating capacitor 2204. The switching devices 2201, 2205 may be formed of MOSFET, IGBT or the like. In the normal state, the sub switching device 2205 is held in the open state. In this state, the main switching device 2201 is turned on/off, thereby to achieve single voltage resonance.

Figure 19:
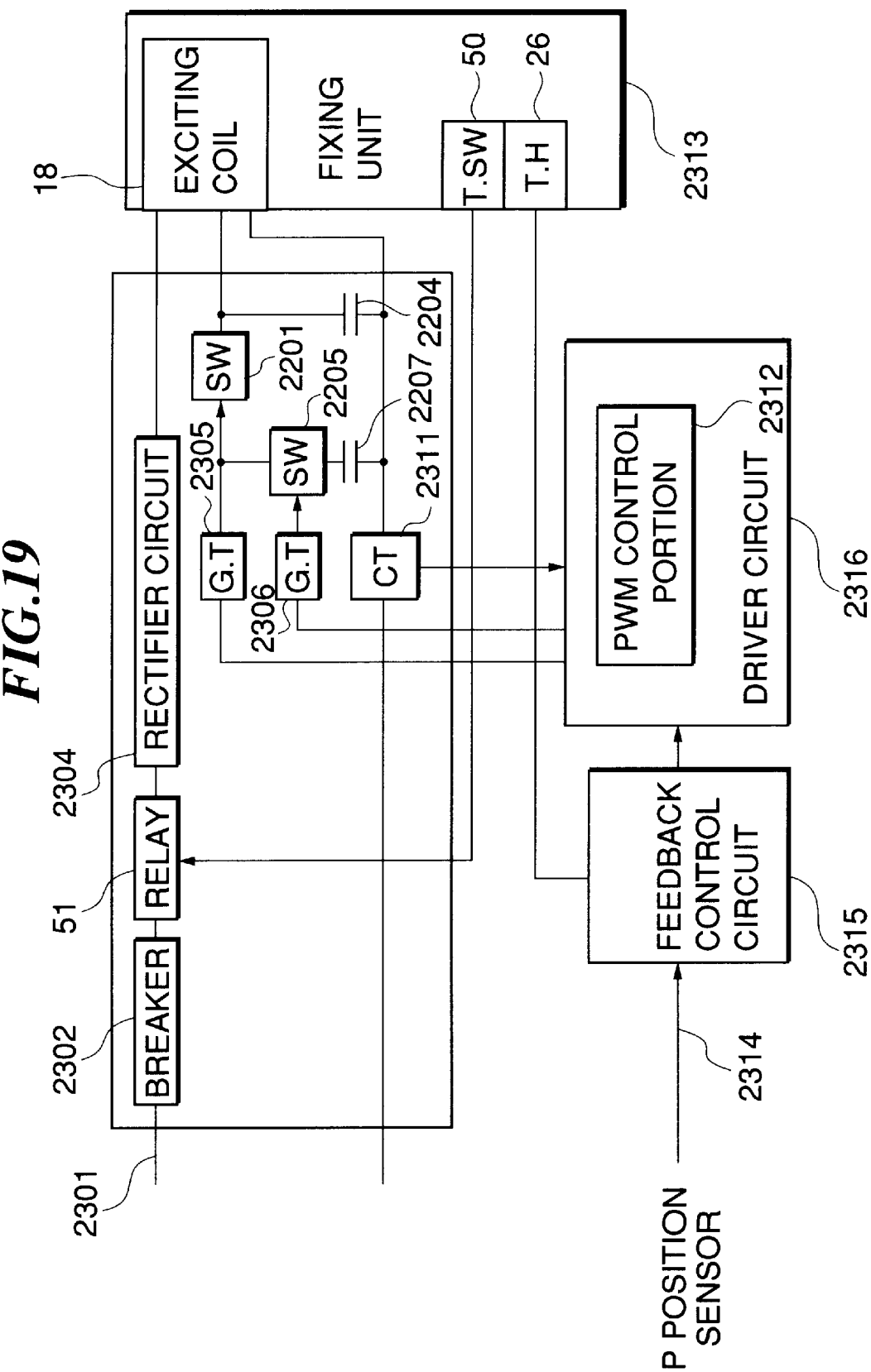
FIG. 19 is a block diagram schematically showing the whole electric arrangement of the induction heating control system of the third embodiment.

FIG. 19 is a block diagram showing the whole arrangement of an induction heating control system including the exciting circuit 27 of FIG. 18.

In FIG. 19, the induction heating control system includes an input terminal 2301 of an AC power supply line, a circuit breaker 2302, a relay switch 51 (refer to FIG. 8) as described above, a rectifier circuit 2304 that is composed of a bridge rectifier circuit that performs full-wave rectification on an alternating input, and a capacitor that performs high-frequency filtering, and gate control transformers 2305, 2306. The main switching device 2201, sub switching device 2205, main resonating capacitor 2204, and the sub resonating capacitor 2207 correspond to those as indicated in FIG. 18.

The induction heating control system further includes a current transformer (current detecting transformer) 2311 for detecting switching current flowing through the switching device 2201. The current transformer 2311 is connected to the exciting coil 18 in the fixing unit 2313. The fixing unit 2313 has electric devices including the above-indicated exciting coil 18, a thermistor 26, and a thermostatic switch 50 for detecting an excessively elevated temperature.

Reference numeral 2314 denotes a heating ON/OFF signal for the fixing device, namely, a signal that is fed from a printer sequence controller (not shown), based on a detection signal of a sensor for detecting a recording medium P that has been fed to the vicinity of the fixing unit 2313. The induction heating control system further includes a feedback control circuit 2315 that determines a control amount based upon a detected temperature value of the thermistor 26 of the fixing device, by comparing the detected value with the target temperature, and a driver circuit 2316 that receives a feedback control signal from the feedback control circuit 2315 and controls the exciting circuit 27 and others. The driver circuit 2316 incorporates a PWM control portion 2312 which will be described later.

With the arrangement as described above, when an AC voltage is applied to the rectifier circuit 2304 via the power supply line input terminal 2301, overcurrent breaker 2302 and the relay switch 51, a full-wave rectifying diode within the rectifier circuit 2304 produces a pulsating DC voltage. Here, the exciting winding of the relay switch 51 is energized via the thermostatic switch 50 that opens when the temperature of the fixing film 10 is raised to an excessively high level. If a trouble occurs, and the temperature of the fixing film 10 is abnormally elevated to an excessively high level, the relay switch 51 opens, to cut off power from the power supply to the exciting coil 18, thus preventing breakage of the fixing device due to thermal runaway.

By driving the gate transformer 2305 so that the main switching device 2201 that follows the rectifier circuit 2305 performs switching operations, alternating pulse voltage is applied to a resonance circuit formed by the exciting coil 18 and the main resonating capacitor 2204.

As a result, a pulsating DC voltage is applied to the exciting coil 18 while the main switching device 2201 is in the ON state, namely, while current is flowing through the main switching device 2201, and current that is determined by the inductance and resistance of the exciting coil 18 starts flowing through the exciting coil 18. When the main switching device 2201 is turned off in response to a gate signal from the gate transformer 2305, the exciting coil 18 attempts to keep current flowing therethrough, and therefore a high voltage called flyback voltage, which is determined by the capacitance of the main resonating capacitor 2204 and the inductance of the exciting coil 18, appears at the opposite ends of the exciting coil 18. The flyback voltage oscillates about the power supply voltage until it becomes equal to the power supply voltage, if the main switching device 2201 is kept in the OFF state.

If the flyback voltage undergoes large ringing, the flyback voltage measured at the terminal of the main switching device 2201 on the side of the exciting coil 18 becomes negative. During this negative period, the regenerative diode 2202 is turned on, and the voltage at the node of the exciting coil 18 and the main switching device 2201 is clamped to 0V while current is flowing through the exciting coil 18.

It is generally known that the main switching device 2201 can be turned on with zero voltage applied thereto, which is called ZVS (Zero Volt Switching) or soft switching, during the period in which the voltage at the node of the exciting coil 18 and the main switching device 2201 is clamped to 0V. Where the main switching device 2201 is turned on with no voltage applied thereto, the loss resulting from the switching of the switching device 2201 can be minimized, thus permitting highly efficient switching with reduced noise.

In the present embodiment, the sub switching device 2205 and sub resonating capacitor 2207 as described later in detail are provided as devices for controlling the circuit so that the main switching device 2201 is sure to perform soft switching operations even if the flyback voltage is reduced.

The thermistor 26 as indicated above detects the temperature of the fixing film 10 at the fixing nip portion N. More specifically, a change in the resistance of the thermistor 26 is converted to a voltage, which is then compared with a predetermined reference voltage, so that the thermistor 26 detects a difference between the detected temperature and the target temperature. The width of the ON time (or ON duration) of the main switching device 2201 is determined based on the result of the detection, and PWM (Pulse Width Modulation) control is performed based on the ON duration thus determined.

The PWM control portion 2312 has two pairs of constant current source circuits, capacitors and comparators, to provide an ON time control portion and an OFF time control portion, which are not shown, and is adapted to perform PWM control by repeating the ON time and OFF time while changing the time width or duration, through a steering flip-flop by which the OFF time control portion is stopped during the ON time, and the ON time control portion is stopped during the OFF time.

The comparator for the OFF time control is constructed to be adjustable, but not to have a feedback loop, thereby to permit control of a fixed or predetermined period of time, whereas the comparator for the ON time control is adapted to have feedback of temperature information, thus realizing temperature control. The maximum period of time during which current flows through the exciting coil 18, namely, the maximum period of time during which the main switching device 2201 is held ON, is determined by the voltage value of the AC line and the electric power that can be supplied, and the control signal from the driver circuit 2316 is held in a range that does not exceed the maximum period of time. The PWM control portion 2312 may also be constructed so as to define the minimum value of the ON duration of the main switching device 2201.

Where the temperature of the fixing device is low upon turn-on of the power supply in the morning, for example, electric power is supplied to the main switching device 2201 with the ON duration approximate to the maximum duration. Namely, electric power is supplied to the main switching device 2201 with the maximum ON duration after turn-on of the power supply and until temperature control starts functioning, and then power supply is controlled by restricting the ON duration of the main switching device 2201 in response to a signal from the thermistor 26.

As described above, the flyback voltage oscillates relative to the power supply voltage as a reference voltage. When the temperature of the fixing device is elevated to a sufficiently high level, and the ON duration of the main switching device 2201 is reduced by temperature control, especially when the power supply voltage is high, the voltage at the node of the main switching device 2201 and the exciting coil 18 cannot be lowered down to 0V, and ZVS (Zero Volt Switching) cannot be realized. In this case, circuit current detected by the current transformer 2311 is compared with a reference value, and the value of current flowing through the current transformer 2311 in the positive direction (during the ON time) and the value of current flowing through the same in the negative direction (during the OFF time) are detected. If the current flowing in the positive direction is large and the current flowing in the negative direction is small, the sub switching device 2205 is turned on, and then the main switching device 2201 is turned on.

Figure 20:
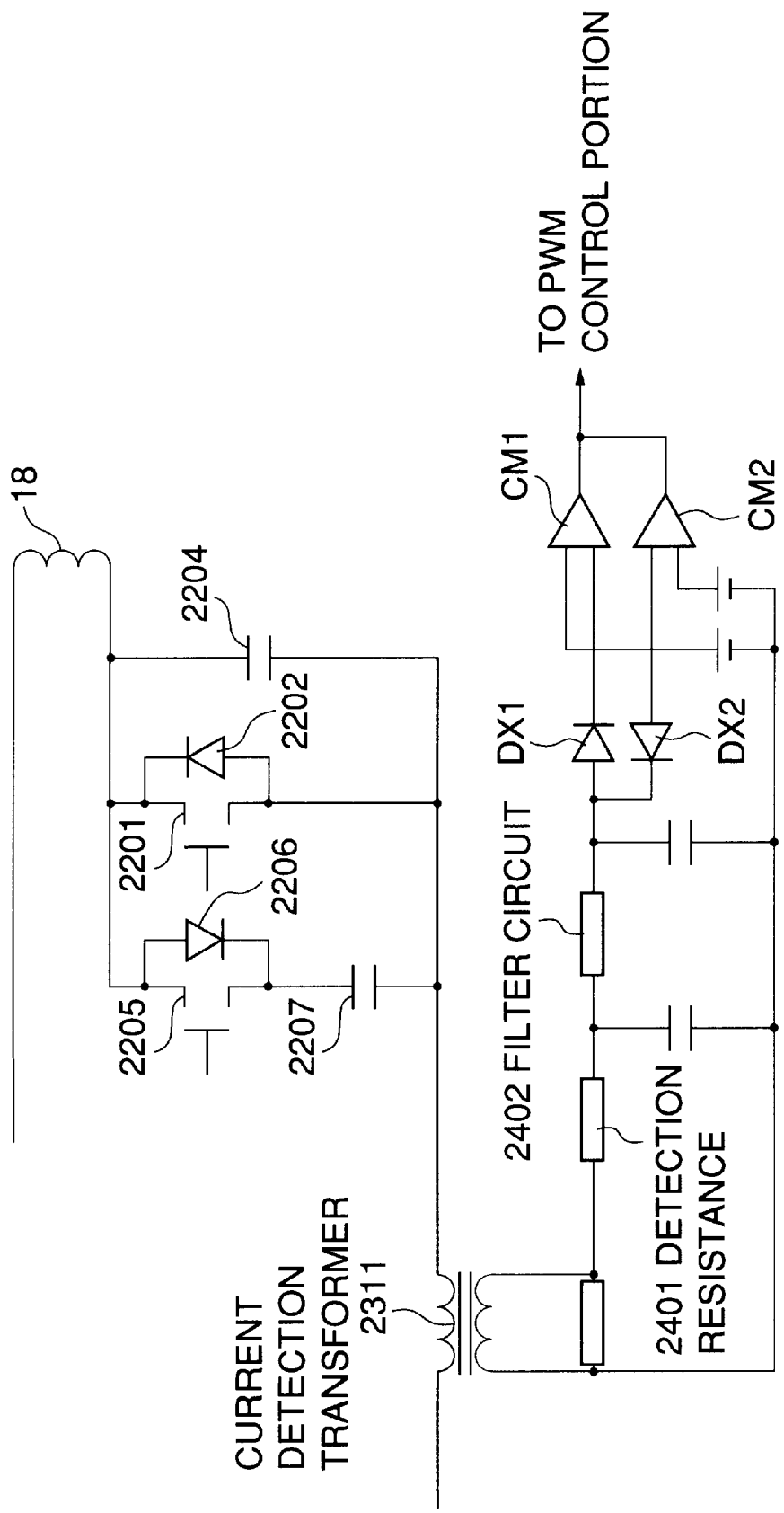
FIG. 20 is a circuit diagram showing a current detecting circuit used in the switching portion of the third embodiment.

FIG. 20 shows a current detecting circuit using the current transformer 2311 as described above. As shown in FIG. 20, the current detecting circuit has the current transformer 2311, detection resistance 2401, filter circuit 2402, diodes DX1, DX2, and comparators CM1, CM2. The current detecting circuit normally detects overcurrent using the detection resistance 2401, and is adapted to perform a limiting operation to restrict electric power when the detected current value exceeds a predetermined value.

The diodes DX1, DX2 function to divide the current detection waveform from which a noise component has been removed by the filter circuit 2402, into a positive component and a negative component, and the comparators CM1, CM2 compare these components with respective reference values. The comparators CM1, CM2 then produce an ON enable signal for the sub switching device 2205, based on the result of comparison, and outputs the signal to the PWM control portion 2312 within the driver circuit 2316. An ON signal that is directly received by the sub switching device 2205 is produced using the PWM control circuit 2312 that turns on/off the main switching device 2201.

Namely, the capacitor for the OFF timer is discharged upon termination of the ON duration, in response to the output from the steering flip-flop, and the capacitor for the OFF timer is then charged by a constant current source. The charge voltage then increases with a constant slope. A window comparator (not shown) is provided so that the sub switching device 2205 is held in the ON state only during a predetermined range of charge voltage during charging of the capacitor. Thus, in the present embodiment, the sub switching device 2205 is turned on prior to turn-on of the main switching 2201, while the main switching device 2201 is in the OFF state.

<Fourth Embodiment>

In the third embodiment described above, whether the flyback voltage crosses zero or not is determined by detecting circuit current. In the fourth embodiment, on the other hand, whether the flyback voltage crosses zero or not is determined by detecting the power supply voltage.

Figure 21:
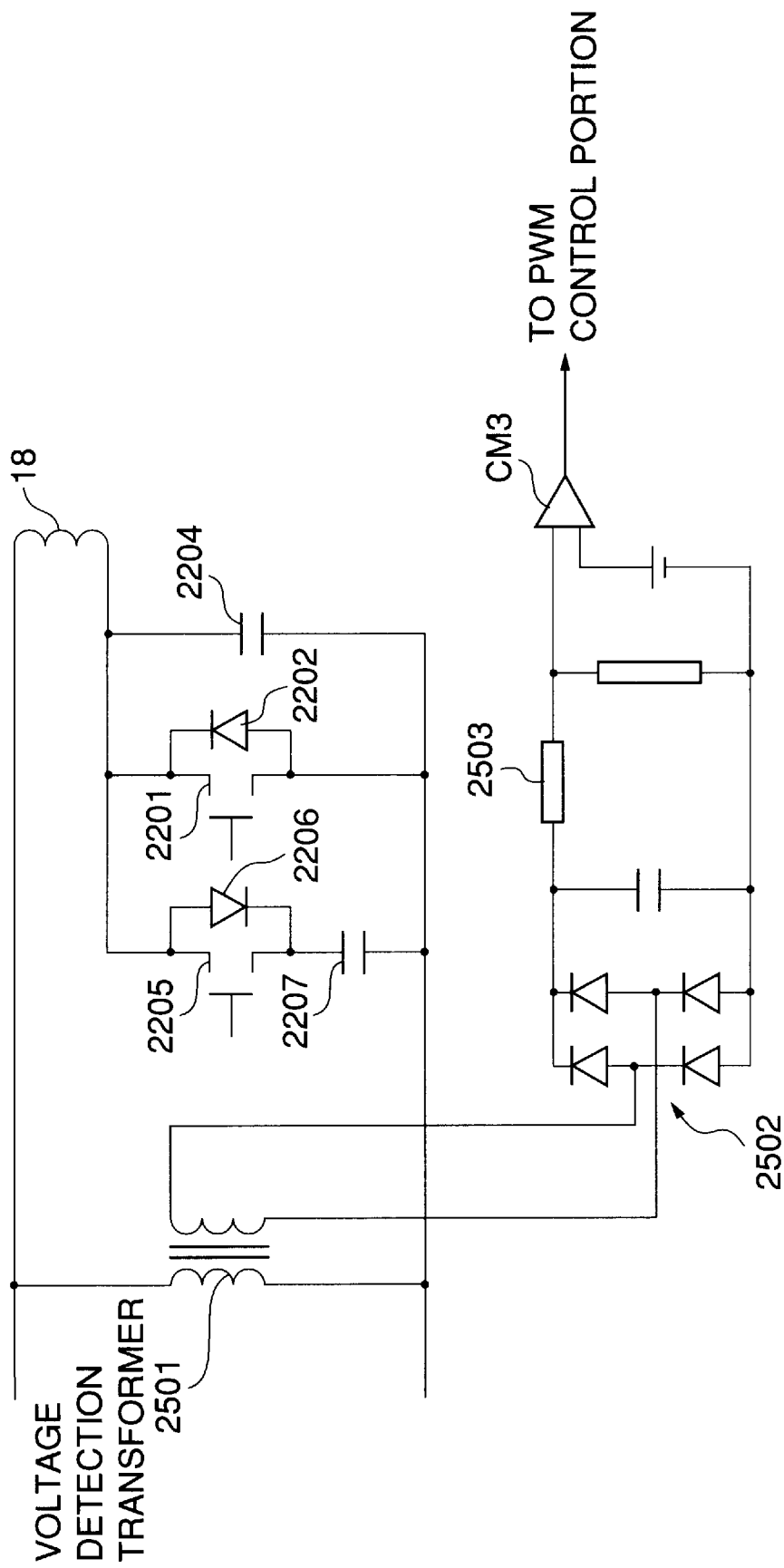
FIG. 21 is a circuit diagram showing a power supply voltage detecting circuit used in the switching portion according to a fourth embodiment of the present invention.
Figure 22:
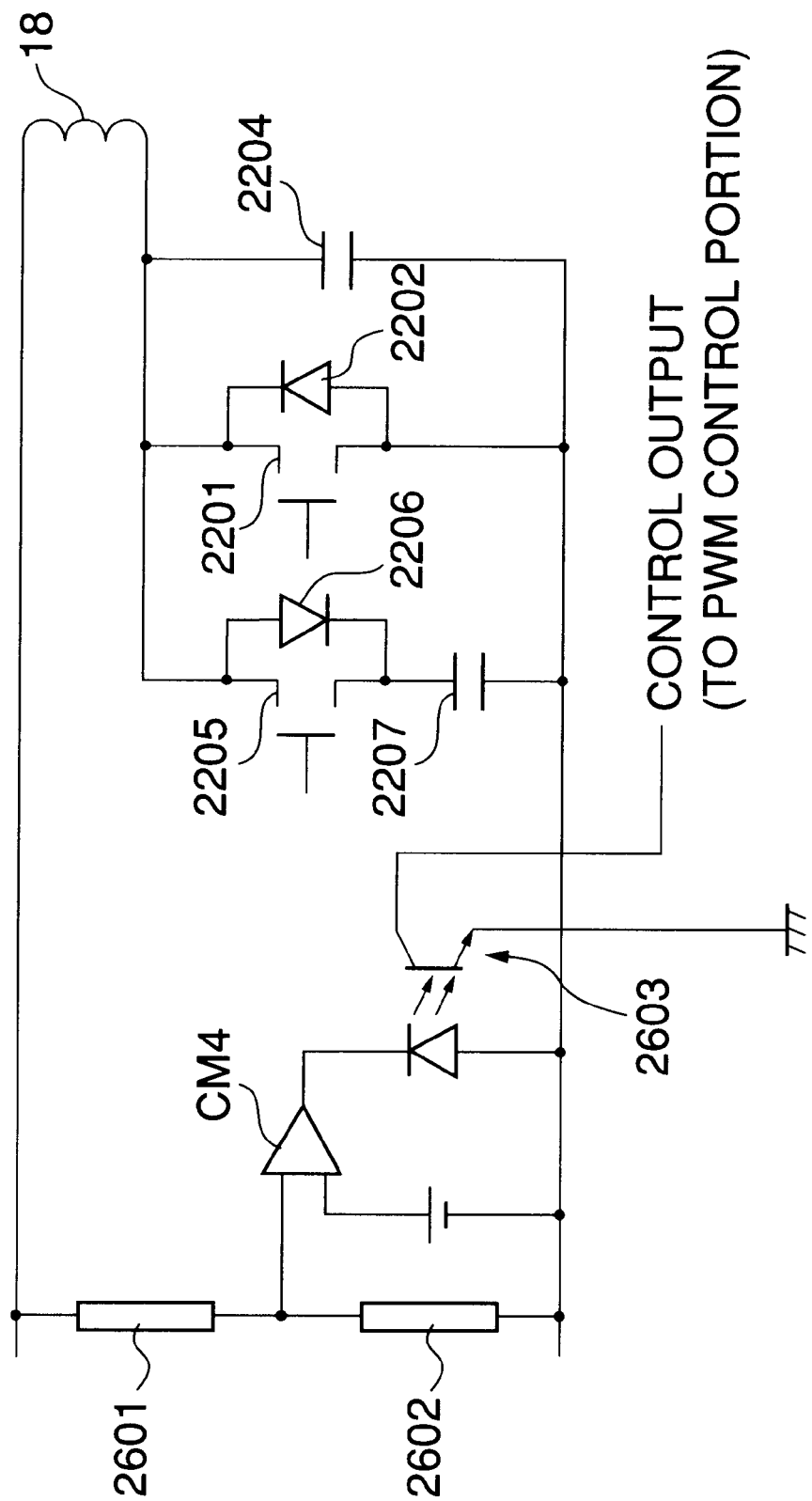
FIG. 22 is a circuit diagram showing another power supply voltage detecting circuit used in the switching portion according to a fourth embodiment of the present invention.

FIG. 21 is a circuit diagram of a power supply voltage detecting circuit. The power supply voltage detecting circuit includes an AC line voltage detection transformer 2501, a diode bridge 2502 for rectification, and a detection resistance 2503 through which detection current flows. The detection circuit is constructed so as to detect the voltage waveform of the AC line at an insulating distance. A comparator CM3 compares the detected voltage with a reference value, and a signal that indicates the fact that the detected voltage becomes smaller than the predetermined reference value is transmitted to the PWM control circuit 2316.

On the other hand, the PWM control circuit 2316 controls the ON duration of the main switching device 2201 based on temperature information, and the ON duration is shortened when the circuit is brought into a temperature control state. Namely, where the width of the duty control signal becomes equal to or smaller than a predetermined value, a switching enable signal is generated to the sub switching device 2205. The reference voltage used by the comparator CM3 may be variable, and in fact, is changed depending upon a D/A output from a printer sequence controller.

The AC line voltage detection transformer 2501 and the rectifier diode bridge 2502 are necessary for detecting the voltage waveform of the AC line. If it is only required to determine if the voltage of the AC line is equal to or larger than a fixed level, however, resistances 2601, 2602 for voltage detection and a comparator CM4 may be provided, and a photocoupler 2603 may be used for informing the PWM circuit 2312 of the period during which the voltage of the AC line is high.

<Fifth Embodiment>

Whether the flyback voltage crosses zero or not may be determined by detecting current flowing through the regenerative diode 2202 that is connected in parallel with the main switching device 2201.

Figure 23:
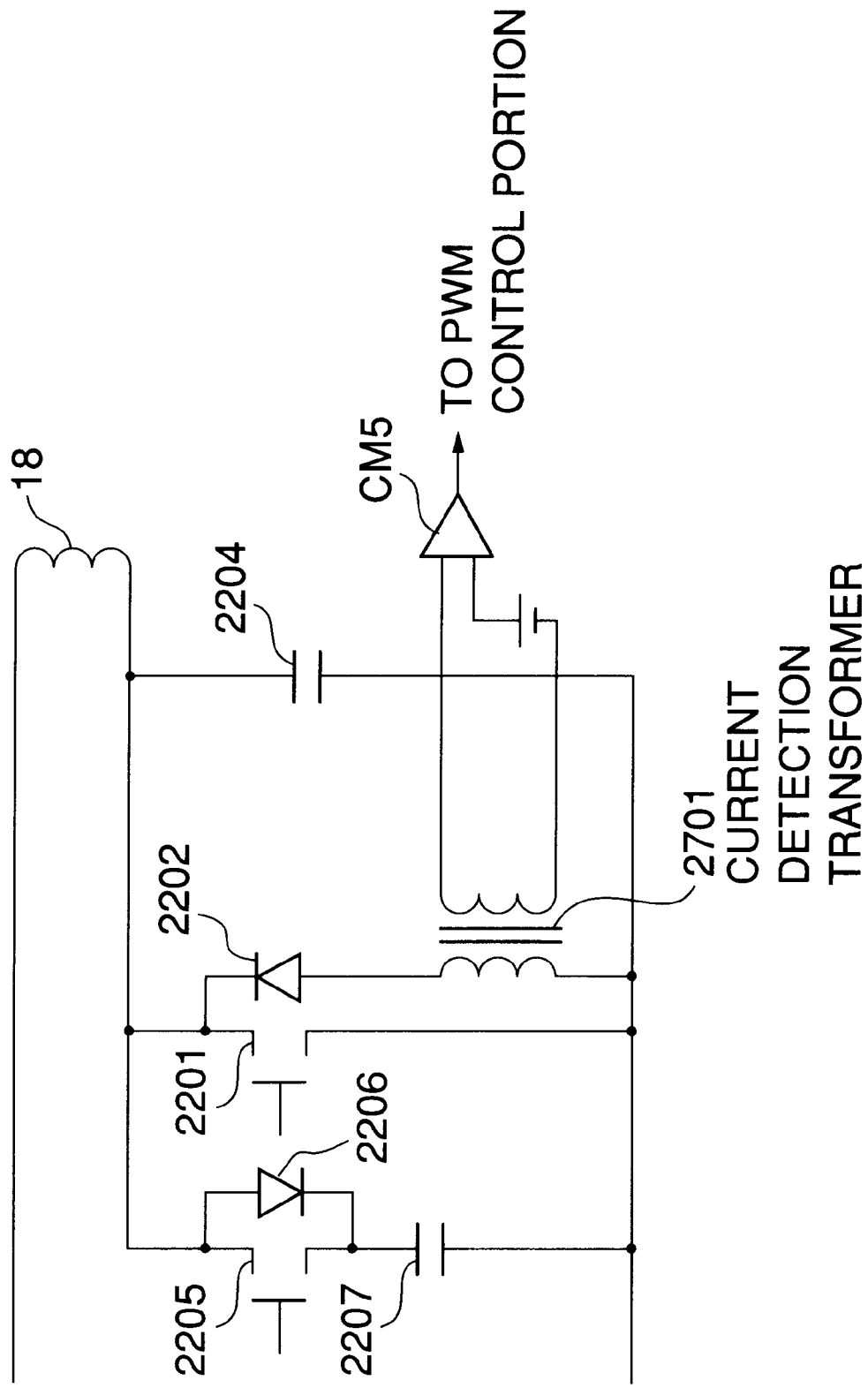
FIG. 23 is a circuit diagram showing a zero-cross detecting circuit used in the switching portion according to a fifth embodiment of the present invention.
Figure 24:
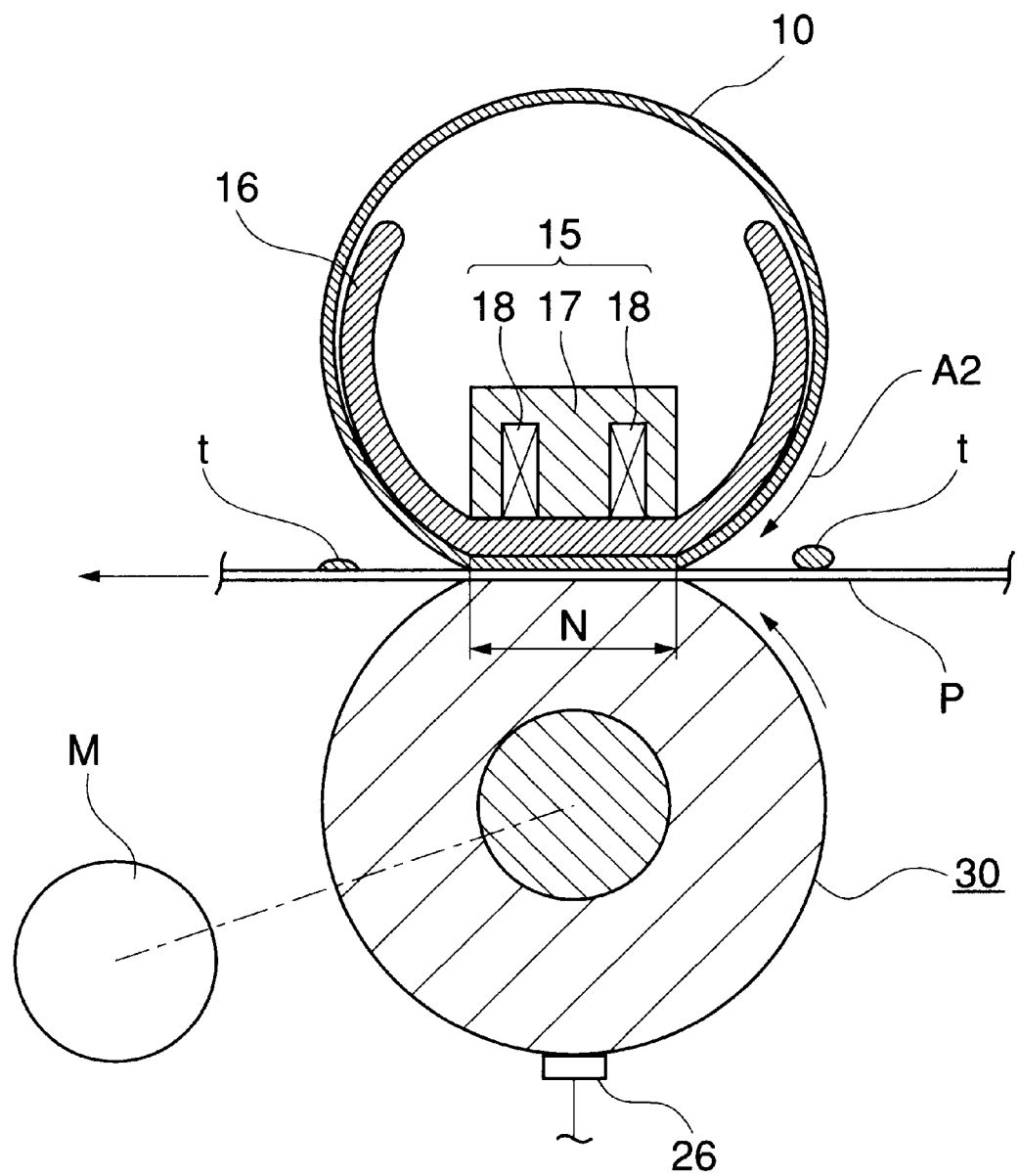
FIG. 24 is a view showing essential parts of a conventional fixing device in transverse cross section.

As shown in FIG. 23, a current detection transformer 2701 is provided on the anode side of the Zener diode 2202, and current flowing through the regenerative diode 2202 is detected by the current detection transformer 2701. In this case, where the flyback voltage crosses zero, current flows through the regenerative diode 2202, and the current is detected by the current detection transformer 2701. The comparator CM5 compares a value of the current generated from the current detection transformer 2701, with a reference value, and the result of comparison is generated as an enable signal of the main switching device 2201 to the PWM control portion 2312.

In the third through fifth embodiments as explained above, where electric power per switching pulse is small, the sub switching device 2205 is turned on immediately before the main switching device 2201 is turned on, so that the main switching device 2201 can always perform soft switching actions with reduced noise, and so that the power control range of the main switching device 2201 is increased.

With the above arrangement, the electric power to be applied to the main switching device 2201 can be reduced, and switching loss at the main switching device 2201 can be reduced, thus assuring an increased energy efficiency. Consequently, the service life of the fixing device can be prolonged, and the reliability is improved.

The present invention may be embodied with various other modifications or changes, without departing from the scope of the invention as defined in the appended claims.

What is claimed is:

1. A power supply device comprising:
   a first switching device;
   a first charging device connected in series with the first switching device;
   a second switching device connected in series with the first charging device;
   a magnetic field generating device that is connected between a power supply line and a node between the first charging device and the second switching device;
   a second charging device connected in parallel with the second switching device;
   a first rectifying device connected in parallel with the first switching device;
   a second rectifying device connected in parallel with the second switching device; and
   a switching control circuit that controls driving of the first and second switching devices.

2. A power supply device according to claim 1, wherein the switching control circuit alternately turns on the first switching device and the second switching device.

3. A power supply device according to claim 2, wherein the switching control circuit turns off the first switching device before turning on the second switching device.

4. A power supply device according to claim 1, wherein the magnetic field generating device and the first charging device constitute a first resonance circuit, and the magnetic field generating device and the second charging device constitute a second resonance circuit.

5. A power supply device according to claim 1, wherein the second charging device has a capacity that is sufficiently smaller than that of the first charging device.

6. A power supply device according to claim 1, which is provided in a heat generating device that generates heat utilizing electromagnetic induction of the magnetic field generating device.

7. A power supply device according to claim 6, wherein said heat generating device is a fixing device of an image recording apparatus that employs an electrophotographic recording method.

8. A power supply device, comprising:
   a first switching device;
   a first charging device connected in series with the first switching device;
   a second switching device connected in series with the first charging device;
   a magnetic field generating device that is connected between a node of the first charging device and the second switching device, and a power supply line;
   a second charging device connected in parallel with the magnetic field generating device;
   a first rectifying device connected in parallel with the first switching device;
   a second rectifying device connected in parallel with the second switching device; and
   a switching control circuit that controls driving of the first and second switching devices.

9. A power supply device according to claim 8, wherein the switching control circuit alternately turns on the first switching device and the second switching device.

10. A power supply device according to claim 9, wherein the switching control circuit turns off the first switching device before turning on the second switching device.

11. A power supply device according to claim 8, wherein the magnetic field generating device and the first charging device constitute a first resonance circuit, and the magnetic field generating device and the second charging device constitute a second resonance circuit.

12. A power supply device according to claim 8, wherein the second charging device has a capacity that is sufficiently smaller than that of the first charging device.

13. A power supply device according to claim 8, which is provided in a heat generating device that generates heat utilizing electromagnetic induction of the magnetic field generating device.

14. A power supply device according to claim 13, wherein the heat generating device is a fixing device of an image recording apparatus that employs an electrophotographic recording method.

15. A voltage resonance method for use in a power supply device comprising:
   a first switching device;
   a first charging device connected in series with the first switching device;
   a second switching device connected in series with the first charging device;
   a magnetic field generating device that is connected between a power supply line and a node between the first charging device and the second switching device;

a second charging device connected in parallel with the second switching device;
a first rectifying device connected in parallel with the first switching device; and
a second rectifying device connected in parallel with the second switching device,
said voltage resonance method comprising the steps of:
turning on the first switching device;
turning off the first switching device before turning on the first switching device; and
turning on the second switching device after turning off the first switching device.

16. A voltage resonance method according to claim 15, wherein the magnetic field generating device and the first charging device constitute a first resonance circuit, and the magnetic field generating device and the second charging device constitute a second resonance circuit.

17. A voltage resonance method according to claim 15, wherein the second charging device has a capacity that is sufficiently smaller than that of the first charging device.

18. A voltage resonance method according to claim 15, wherein the power supply device is provided in a heat generating device that generates heat utilizing electromagnetic induction of the magnetic field generating device.

19. A voltage resonance method according to claim 18, wherein the heat generating device is a fixing device of an image recording apparatus that employs an electrophotographic recording method.

20. A voltage resonance method for use in a power supply device comprising:
a first switching device;
a first charging device connected in series with the first switching device;
a second switching device connected in series with the first charging device;
a magnetic field generating device that is connected between a power supply line and a node between the first charging device and the second switching device;
a second charging device connected in parallel with the magnetic field generating device;
a first rectifying device connected in parallel with the first switching device; and
a second rectifying device connected in parallel with the second switching device,
said voltage resonance method comprising the steps of:
turning on the first switching device;
turning off the first switching device before turning on the second switching device; and
turning on the second switching device after turning off the first switching device.

21. A voltage resonance method according to claim 20, wherein the magnetic field generating device and the first charging device constitute a first resonance circuit, and the magnetic field generating device and the second charging device constitute a second resonance circuit.

22. A voltage resonance method according to claim 20, wherein the second charging device has a capacity that is sufficiently smaller than that of the first charging device.

23. A voltage resonance method according to claim 20, wherein the power supply device is provided in a heat generating device that generates heat utilizing electromagnetic induction of the magnetic field generating device.

24. A voltage resonance method according to claim 23, wherein the heat generating device is a fixing device of an image recording apparatus that employs an electrophotographic recording method.

25. A power supply device, comprising:
a magnetic field generating device;
a first switching device connected in series with the magnetic field generating device;
a first charging device connected in series with the first switching device;
a second switching device connected in parallel with a line on which the first switching device and the first charging device are connected in series;
a second charging device connected in parallel with the second switching device;
a first rectifying device connected in parallel with the first switching device;
a second rectifying device connected in parallel with the second switching device; and
a switching control circuit that controls driving of the first and second switching devices.

26. A power supply device according to claim 25, further comprising a power detecting circuit that detects electric power supplied to the magnetic field generating device, and wherein said switching control circuit turns on the first switching device before turning on the second switching device, depending upon the electric power detected by the power detecting circuit.

27. A power supply device according to claim 26, wherein the power detecting circuit detects current that flows through the first switching device.

28. A power supply device according to claim 25, further comprising a voltage detecting circuit that detects flyback voltage that appears in the magnetic field generating device, and wherein said switching control circuit turns on the first switching device before turning on the second switching device when the flyback voltage detected by the voltage detecting circuit is equal to or smaller than a predetermined value.

29. A power supply device according to claim 25, further comprising:
a voltage detecting circuit that detects a voltage of a power supply line; and
a temperature detecting circuit that detects a temperature of a heat generating body that generates heat utilizing a magnetic field generated by the magnetic field generating device,
and wherein said switching control circuit turns on the first switching device before turning on the second switching device when the voltage detected by the voltage detecting circuit is equal to or larger than a predetermined value, and an ON duration of the second switching device is reduced to be smaller than a predetermined value while the heat generating body is maintained at a predetermined temperature based on an output of the temperature detecting circuit.

30. A power supply device according to claim 25, further comprising:
a current detecting circuit that detects current that flows through the first rectifying device; and
a temperature detecting circuit that detects a temperature of a heat generating body that generates heat utilizing a magnetic field generated by the magnetic field generating device,
and wherein said switching control circuit turns on the first switching device before turning on the second switching device when the current detected by the current detecting circuit is equal to or larger than a predetermined value, and an ON duration of the second switching device is reduced to be smaller than a predetermined value while the heat generating body is maintained at a predetermined temperature based on an output of the temperature detecting circuit.

31. A magnetic field generating device comprising:

an exciting coil for generating a magnetic field;

first switching means connected in series with the exciting coil;

a first capacitor having opposite terminals and disposed to resonate with the exciting coil in response to switching operations of the first switching means; and second switching means disposed to have switching operations thereof controlled so as to reduce a potential difference between the opposite terminals of the first switching device in on/off timing of the first switching device.

32. A magnetic field generating device according to claim 31, wherein the first capacitor is connected in parallel with the exciting coil or the first switching means.

33. A magnetic field generating device according to claim 31, further comprising a second capacitor connected in series with the second switching means to form a series circuit together therewith, and wherein the series circuit is connected in parallel with the exciting coil or the first switching circuit.

34. A magnetic field generating circuit according to claim 33, wherein the first capacitor is connected in parallel with the exciting coil or the first switching device.

35. A magnetic field generating circuit according to claim 31, wherein the first switching device has switching operations thereof controlled by pulse width modulation.

36. A heat generating device comprising:

an exciting coil for generating a magnetic field;

a heat generating member disposed to generate heat due to the magnetic field generated by the exciting coil;

first switching means connected in series with the exciting coil;

a first capacitor having opposite terminals and disposed to resonate with the exciting coil in response to switching operations of the first switching means; and second switching means disposed to have switching operations thereof controlled so as to reduce a potential difference between the opposite terminals of the first switching device in on/off timing of the first switching device.

37. A heat generating device according to claim 36, wherein the first capacitor is connected in parallel with the exciting coil or the first switching means.

38. A heat generating device according to claim 36, further comprising a second capacitor connected in series with the second switching means to form a series circuit together therewith, and wherein the series circuit is connected in parallel with the exciting coil or the first switching circuit.

39. A heat generating circuit according to claim 38, wherein the first capacitor is connected in parallel with the exciting coil or the first switching device.

40. A heat generating circuit according to claim 36, wherein the first switching device has switching operations thereof controlled by pulse width modulation.

41. A fixing device of an image forming apparatus, comprising:

an exciting coil for generating a magnetic field;

a heat generating member disposed to generate heat due to the magnetic field generated by the exciting coil;

first switching means connected in series with the exciting coil;

a first capacitor having opposite terminals and disposed to resonate with the exciting coil in response to switching operations of the first switching means; and second switching means disposed to have switching operations thereof controlled so as to reduce a potential difference between the opposite terminals of the first switching device in on/off timing of the first switching device;

wherein the heat generating device thermally fixes images formed on recording media onto the recording media.

42. A fixing device according to claim 41, wherein the first capacitor is connected in parallel with the exciting coil or the first switching means.

43. A fixing device according to claim 41, further comprising a second capacitor connected in series with the second switching means to form a series circuit together therewith, and wherein the series circuit is connected in parallel with the exciting coil or the first switching circuit.

44. A fixing device according to claim 43, wherein the first capacitor is connected in parallel with the exciting coil or the first switching device.

45. A fixing device according to claim 41, wherein the first switching device has switching operations thereof controlled by pulse width modulation.

46. An image forming apparatus comprising:

image forming means for forming images on recording media;

an exciting coil for generating a magnetic field;

a heat generating member disposed to generate heat due to the magnetic field generated by the exciting coil;

first switching means connected in series with the exciting coil;

a first capacitor having opposite terminals and disposed to resonate with the exciting coil in response to switching operations of the first switching means; and second switching means disposed to have switching operations thereof controlled so as to reduce a potential difference between the opposite terminals of the first switching device in on/off timing of the first switching device;

wherein the heat generating device thermally fixes images formed on the recording media onto the recording media.

47. An image forming apparatus according to claim 46, wherein the first capacitor is connected in parallel with the exciting coil or the first switching means.

48. An image forming apparatus according to claim 46, further comprising a second capacitor connected in series with the second switching means to form a series circuit together therewith, and wherein the series circuit is connected in parallel with the exciting coil or the first switching circuit.

49. An image forming apparatus according to claim 48, wherein the first capacitor is connected in parallel with the exciting coil or the first switching device.

50. An image forming apparatus according to claim 46, wherein the first switching device has switching operations thereof controlled by pulse width modulation.

* * * * *